United States Patent
Welter et al.

(10) Patent No.: US 12,551,658 B2
(45) Date of Patent: Feb. 17, 2026

(54) STEERABLE INTRODUCER WITH SLIDE BLOCK DIVIDER

(71) Applicant: St. Jude Medical, Cardiology Division, Inc., St. Paul, MN (US)

(72) Inventors: Wade Welter, Crystal, MN (US); Andrew Oliverius, Zimmerman, MN (US); Troy Tegg, Elk River, MN (US); Neil Hawkinson, Ramsey, MN (US); Manuel Tobias Cajamarca, Shakopee, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 369 days.

(21) Appl. No.: 18/122,367

(22) Filed: Mar. 16, 2023

(65) Prior Publication Data

US 2023/0302256 A1 Sep. 28, 2023

Related U.S. Application Data

(60) Provisional application No. 63/396,297, filed on Aug. 9, 2022, provisional application No. 63/323,744, filed on Mar. 25, 2022.

(51) Int. Cl.
*A61M 25/01* (2006.01)
*A61M 25/00* (2006.01)

(52) U.S. Cl.
CPC ...... *A61M 25/0105* (2013.01); *A61M 25/005* (2013.01)

(58) Field of Classification Search
CPC ............ A61M 25/0105; A61M 25/005; A61M 25/0662; A61M 25/0136; A61M 25/0147
See application file for complete search history.

(56) References Cited

U.S. PATENT DOCUMENTS

| | | | |
|---|---|---|---|
| 4,817,613 | A | 4/1989 | Jaraczewski et al. |
| 5,224,939 | A | 7/1993 | Holman et al. |
| 5,380,301 | A | 1/1995 | Prichard et al. |
| 5,400,783 | A | 3/1995 | Pomeranz et al. |
| 5,456,254 | A | 10/1995 | Pietroski et al. |

(Continued)

FOREIGN PATENT DOCUMENTS

| | | |
|---|---|---|
| AU | 2016204351 A1 | 1/2017 |
| AU | 2016204353 A1 | 1/2017 |

(Continued)

*Primary Examiner* — Jeffrey G. Hoekstra
(74) *Attorney, Agent, or Firm* — Kilpatrick Townsend & Stockton LLP

(57) ABSTRACT

A steerable introducer deflectable via a handle assembly is described. The handle assembly includes slide members disposed within a slide chassis and coupled to deflection wires to deflect the introducer, and a slide block divider for constraining slide members. The slide block divider and the slide chassis combine to form a slide compartment in which each of the first slide member and the second slide member is slidably disposed. The slide block divider can prevent the deflection wires from crossing each other within the handle assembly, and constrain each of the slide members during translation within the slide compartment to inhibit motion transverse to a longitudinal direction of the slide compartment. The slide block divider can provide an improved handling of the steerable introducer.

20 Claims, 24 Drawing Sheets

(56) References Cited

U.S. PATENT DOCUMENTS

| | | |
|---|---|---|
| 5,626,136 A | 5/1997 | Webster, Jr. |
| 5,715,817 A | 2/1998 | Stevens-Wright et al. |
| 5,715,832 A | 2/1998 | Koblish et al. |
| 5,827,278 A | 10/1998 | Webster, Jr. |
| 5,876,373 A | 3/1999 | Giba et al. |
| 6,074,379 A | 6/2000 | Prichard |
| 6,273,404 B1 | 8/2001 | Holman et al. |
| 6,491,681 B1 | 12/2002 | Kunis et al. |
| 6,551,283 B1 | 4/2003 | Guo et al. |
| 6,554,794 B1 | 4/2003 | Mueller et al. |
| 6,632,200 B2 | 10/2003 | Guo et al. |
| 7,004,937 B2 | 2/2006 | Lentz et al. |
| 7,081,106 B1 | 7/2006 | Guo et al. |
| 7,214,220 B2 | 5/2007 | McGlinch et al. |
| 7,217,256 B2 | 5/2007 | Di Palma |
| 7,608,063 B2 | 10/2009 | Le et al. |
| 7,625,365 B2 | 12/2009 | McGlinch et al. |
| 7,666,204 B2 | 2/2010 | Thornton et al. |
| 7,691,095 B2 | 4/2010 | Bednarek et al. |
| 7,823,258 B2 | 11/2010 | Tegg |
| 7,914,515 B2 | 3/2011 | Heideman et al. |
| 7,959,601 B2 | 6/2011 | McDaniel et al. |
| 7,985,215 B2 | 7/2011 | Guo et al. |
| 8,103,327 B2 | 1/2012 | Harlev et al. |
| 8,137,321 B2 | 3/2012 | Argentine |
| 8,221,390 B2 | 7/2012 | Pal et al. |
| 8,231,569 B2 | 7/2012 | Grasse et al. |
| 8,273,016 B2 | 9/2012 | O'Sullivan |
| 8,323,239 B2 | 12/2012 | Bednarek et al. |
| 8,376,990 B2 | 2/2013 | Ponzi et al. |
| 8,447,377 B2 | 5/2013 | Harlev et al. |
| 8,480,636 B2 | 7/2013 | Khieu et al. |
| 8,603,066 B2 | 12/2013 | Heidman et al. |
| 8,608,703 B2 | 12/2013 | Riles et al. |
| 8,649,880 B1 | 2/2014 | Parker, Jr. |
| 8,700,120 B2 | 4/2014 | Koblish |
| 8,706,193 B2 | 4/2014 | Govari et al. |
| 8,755,861 B2 | 6/2014 | Harlev et al. |
| 8,771,267 B2 | 7/2014 | Kunis et al. |
| 8,777,929 B2 | 7/2014 | Schneider et al. |
| 8,792,962 B2 | 7/2014 | Esguerra et al. |
| 8,814,824 B2 | 8/2014 | Kauphusman et al. |
| 8,814,825 B2 | 8/2014 | Tegg et al. |
| 8,858,495 B2 | 10/2014 | Tegg et al. |
| 8,882,705 B2 | 11/2014 | McDaniel et al. |
| 8,894,610 B2 | 11/2014 | Macnamara et al. |
| 8,979,841 B2 | 3/2015 | Kunis et al. |
| 8,996,091 B2 | 3/2015 | de la Rama et al. |
| 9,017,308 B2 | 4/2015 | Klisch et al. |
| 9,033,917 B2 | 5/2015 | Magana et al. |
| 9,050,010 B2 | 6/2015 | Bui et al. |
| 9,101,733 B2 | 8/2015 | McDaniel |
| 9,132,258 B2 | 9/2015 | Bednarek et al. |
| 9,173,642 B2 | 11/2015 | Blaskowski et al. |
| 9,204,929 B2 | 12/2015 | Solis |
| 9,216,056 B2 | 12/2015 | Datta et al. |
| 9,247,990 B2 | 2/2016 | Kauphusman et al. |
| 9,259,813 B2 | 2/2016 | Heideman et al. |
| 9,326,815 B2 | 5/2016 | Watson |
| 9,339,631 B2 | 5/2016 | Graham et al. |
| 9,433,751 B2 | 9/2016 | Ponzi et al. |
| 9,433,752 B2 | 9/2016 | Jimenez et al. |
| 9,468,495 B2 | 10/2016 | Kunis et al. |
| 9,474,486 B2 | 10/2016 | Eliason et al. |
| 9,486,280 B2 | 11/2016 | Koblish et al. |
| 9,486,282 B2 | 11/2016 | Solis |
| 9,492,636 B2 | 11/2016 | Heideman et al. |
| 9,522,035 B2 | 12/2016 | Highsmith |
| 9,539,413 B2 | 1/2017 | Ogle |
| 9,629,675 B2 | 4/2017 | Kleshinski et al. |
| 9,649,158 B2 | 5/2017 | Datta et al. |
| 9,687,166 B2 | 6/2017 | Subramaniam et al. |
| 9,693,733 B2 | 7/2017 | Altmann et al. |
| 9,694,159 B2 | 7/2017 | Schneider et al. |
| 9,694,161 B2 | 7/2017 | Selkee |
| 9,788,895 B2 | 10/2017 | Solis |
| 9,820,664 B2 | 11/2017 | Hoitink et al. |
| 9,844,645 B2 | 12/2017 | Pai et al. |
| 9,848,795 B2 | 12/2017 | Marecki et al. |
| 9,919,132 B2 | 3/2018 | Tegg et al. |
| 9,949,656 B2 | 4/2018 | Wu et al. |
| 9,986,949 B2 | 6/2018 | Govari et al. |
| 10,004,877 B2 | 6/2018 | Tegg |
| 10,034,637 B2 | 7/2018 | Harlev et al. |
| 10,035,000 B2 | 7/2018 | Bednarek et al. |
| 10,052,457 B2 | 8/2018 | Nguyen et al. |
| 10,065,019 B2 | 9/2018 | Hamuro et al. |
| 10,099,036 B2 | 10/2018 | Heideman et al. |
| 10,118,022 B2 | 11/2018 | Helgeson et al. |
| 10,130,423 B1 | 11/2018 | Viswanathan et al. |
| 10,130,791 B2 | 11/2018 | Heideman et al. |
| 10,136,829 B2 | 11/2018 | Deno et al. |
| 10,143,394 B2 | 12/2018 | Solis |
| 10,172,673 B2 | 1/2019 | Viswanathan et al. |
| 10,183,149 B2 | 1/2019 | Tegg et al. |
| 10,322,261 B2 | 6/2019 | Pai et al. |
| 10,362,952 B2 | 7/2019 | Basu et al. |
| 10,362,954 B2 | 7/2019 | de la Rama et al. |
| 10,376,170 B2 | 8/2019 | Quinn et al. |
| 10,384,036 B2 | 8/2019 | Romoscanu |
| 10,398,500 B2 | 9/2019 | Huszar et al. |
| 10,470,682 B2 | 11/2019 | Deno et al. |
| 10,478,247 B2 | 11/2019 | Litscher et al. |
| 10,478,325 B2 | 11/2019 | Syed |
| 10,492,729 B2 | 12/2019 | de la Rama et al. |
| 10,506,938 B2 | 12/2019 | Wu et al. |
| 10,532,187 B2 | 1/2020 | Schultz et al. |
| 10,537,259 B2 | 1/2020 | Wu et al. |
| 10,542,899 B2 | 1/2020 | Wu et al. |
| 10,556,091 B2 | 2/2020 | Truhler et al. |
| 10,575,742 B2 | 3/2020 | Wu et al. |
| 10,575,745 B2 | 3/2020 | Solis |
| 10,595,738 B2 | 3/2020 | Sterrett et al. |
| 10,595,740 B2 | 3/2020 | Hoitink et al. |
| 10,602,948 B2 | 3/2020 | Wu et al. |
| 10,646,692 B2 | 5/2020 | Tegg et al. |
| 10,653,423 B2 | 5/2020 | Starnes |
| 10,702,677 B2 | 7/2020 | Okamura et al. |
| 10,737,060 B2 | 8/2020 | Gupta et al. |
| 10,806,896 B2 | 10/2020 | Davies et al. |
| 10,813,590 B2 | 10/2020 | Ruppersberg |
| 10,835,712 B2 | 11/2020 | Wada |
| 10,842,990 B2 | 11/2020 | de la Rama et al. |
| 10,857,349 B2 | 12/2020 | de la Rama et al. |
| 10,869,992 B2 | 12/2020 | Pai et al. |
| 10,898,685 B2 | 1/2021 | Tegg |
| 10,912,925 B2 | 2/2021 | Houck |
| 10,932,685 B2 | 3/2021 | Wu |
| 10,945,626 B2 | 3/2021 | Fuentes-Ortega et al. |
| 10,946,167 B2 | 3/2021 | Mintz et al. |
| 10,953,196 B2 | 3/2021 | Raab et al. |
| 10,959,636 B2 | 3/2021 | Dahlen et al. |
| 10,966,623 B2 | 4/2021 | Wu et al. |
| 10,966,753 B2 | 4/2021 | Coyle et al. |
| 10,967,150 B2 | 4/2021 | Helgeson et al. |
| 10,987,045 B2 | 4/2021 | Basu et al. |
| 11,033,715 B2 | 6/2021 | Beeckler et al. |
| 11,039,772 B2 | 6/2021 | Wu et al. |
| 11,039,773 B2 | 6/2021 | Sterrett et al. |
| 11,077,298 B2 | 8/2021 | Waldhauser et al. |
| 11,083,400 B2 | 8/2021 | Hoitink et al. |
| 11,116,436 B2 | 9/2021 | Wu et al. |
| 11,116,476 B2 | 9/2021 | Buesseler et al. |
| 11,116,942 B2 | 9/2021 | Beeckler et al. |
| 11,123,051 B2 | 9/2021 | Van Der Linde et al. |
| 11,141,568 B2 | 10/2021 | Hsueh et al. |
| 11,160,482 B2 | 11/2021 | Solis |
| 11,172,858 B2 | 11/2021 | Olson et al. |
| D940,310 S | 1/2022 | de la Rama et al. |
| 11,272,886 B2 | 3/2022 | Harlev et al. |
| D951,438 S | 5/2022 | de la Rama et al. |
| D952,140 S | 5/2022 | de la Rama et al. |
| D952,843 S | 5/2022 | de la Rama et al. |
| 11,382,690 B2 | 7/2022 | Smith et al. |

(56) References Cited

U.S. PATENT DOCUMENTS

| | | |
|---|---|---|
| 11,382,743 B2 | 7/2022 | Marchand et al. |
| 11,383,078 B2 | 7/2022 | de la Rama et al. |
| 11,419,673 B2 | 8/2022 | Kauphusman et al. |
| 11,426,111 B2 | 8/2022 | Olson |
| 11,433,220 B2 | 9/2022 | Oliverius et al. |
| 11,439,460 B2 | 9/2022 | Sliwa et al. |
| 11,446,470 B2 | 9/2022 | Castelli et al. |
| 11,446,471 B2 | 9/2022 | Grunewald |
| D966,506 S | 10/2022 | de la Rama et al. |
| D966,507 S | 10/2022 | de la Rama et al. |
| 11,478,299 B2 | 10/2022 | Webster et al. |
| 11,484,690 B2 | 11/2022 | Tegg et al. |
| 11,491,311 B2 | 11/2022 | Selkee |
| 11,504,205 B2 | 11/2022 | Brucker et al. |
| 11,511,078 B2 | 11/2022 | Gonzalez |
| 11,517,715 B2 | 12/2022 | Govari |
| 11,517,716 B2 | 12/2022 | Nguyen et al. |
| 11,523,748 B2 | 12/2022 | Esguerra Wilczynski et al. |
| 11,540,876 B2 | 1/2023 | Oliverius et al. |
| 11,540,878 B2 | 1/2023 | Fuentes-Ortega et al. |
| 11,547,437 B2 | 1/2023 | Zarembinski |
| 11,553,962 B2 | 1/2023 | Harlev et al. |
| 11,559,663 B2 | 1/2023 | Hannon et al. |
| 11,583,334 B2 | 2/2023 | Caples et al. |
| 11,583,658 B2 | 2/2023 | Yang et al. |
| 11,602,630 B2 | 3/2023 | Vetter et al. |
| 11,617,616 B2 | 4/2023 | Clark et al. |
| 11,617,859 B2 | 4/2023 | Hsueh et al. |
| 11,617,861 B2 | 4/2023 | Pai et al. |
| 11,622,806 B2 | 4/2023 | Romoscanu |
| 11,628,009 B2 | 4/2023 | Aujla |
| 11,660,119 B2 | 5/2023 | Hassett |
| 11,672,947 B2 | 6/2023 | Tegg et al. |
| 11,684,473 B2 | 6/2023 | Righini et al. |
| 11,723,574 B2 | 8/2023 | Wu et al. |
| 11,779,770 B2 | 10/2023 | Botzer |
| 11,786,301 B2 | 10/2023 | Olson |
| 11,806,152 B2 | 11/2023 | Zeidan et al. |
| 11,813,410 B2 | 11/2023 | Olson et al. |
| 11,832,965 B2 | 12/2023 | Wang |
| 11,850,051 B2 | 12/2023 | Selkee et al. |
| 11,857,250 B2 | 1/2024 | Corvi et al. |
| 11,896,819 B2 | 2/2024 | Rosa et al. |
| 11,904,109 B2 | 2/2024 | Gliner et al. |
| 11,938,316 B2 | 3/2024 | Feler et al. |
| 11,944,762 B2 | 4/2024 | Khuu et al. |
| 11,950,827 B2 | 4/2024 | Rafiee et al. |
| 11,950,840 B2 | 4/2024 | Govari et al. |
| 11,950,841 B2 | 4/2024 | Govari et al. |
| 11,950,897 B2 | 4/2024 | Esguerra Wilczynski et al. |
| 11,950,930 B2 | 4/2024 | Gliner et al. |
| 11,957,847 B2 | 4/2024 | Houck |
| 11,992,321 B2 | 5/2024 | Solis |
| 12,004,804 B2 | 6/2024 | Govari et al. |
| 12,004,805 B2 | 6/2024 | Schuler et al. |
| 12,011,216 B2 | 6/2024 | Zirkle et al. |
| 12,036,027 B2 | 7/2024 | Olson et al. |
| 12,036,371 B2 | 7/2024 | Hsueh et al. |
| 12,064,168 B2 | 8/2024 | Harlev et al. |
| 12,076,079 B2 | 9/2024 | Oliverius et al. |
| 12,083,288 B2 | 9/2024 | Lopez et al. |
| 12,089,940 B2 | 9/2024 | Hoitink et al. |
| 12,097,034 B2 | 9/2024 | Wu et al. |
| 12,102,382 B2 | 10/2024 | Govari et al. |
| 12,109,031 B2 | 10/2024 | Deno et al. |
| 12,109,373 B2 | 10/2024 | Srivastava et al. |
| 12,114,922 B2 | 10/2024 | Harlev et al. |
| 12,121,357 B2 | 10/2024 | de la Rama et al. |
| 12,121,438 B2 | 10/2024 | Dehdashtian et al. |
| 12,138,404 B2 | 11/2024 | Beeckler et al. |
| 12,144,629 B2 | 11/2024 | Wu et al. |
| 12,171,488 B2 | 12/2024 | Narayan et al. |
| 12,178,500 B2 | 12/2024 | Highsmith |
| 12,185,961 B2 | 1/2025 | Nguyen et al. |
| 12,186,010 B2 | 1/2025 | Govari et al. |
| 12,193,728 B2 | 1/2025 | Narayan |
| 12,193,823 B2 | 1/2025 | Wu et al. |
| 12,194,251 B2 | 1/2025 | Tavallaei et al. |
| 12,201,351 B2 | 1/2025 | Kim et al. |
| 12,201,421 B2 | 1/2025 | Garai et al. |
| 12,207,795 B2 | 1/2025 | Purohit et al. |
| 12,214,206 B2 | 2/2025 | Ward et al. |
| 12,220,541 B2 | 2/2025 | Highsmith et al. |
| 12,221,163 B2 | 2/2025 | Günther et al. |
| 12,226,141 B2 | 2/2025 | Yaffe et al. |
| 12,226,314 B2 | 2/2025 | Reimer et al. |
| 12,232,755 B2 | 2/2025 | Phan et al. |
| 12,232,874 B2 | 2/2025 | Salazar et al. |
| 12,232,908 B2 | 2/2025 | Stigall et al. |
| 12,239,364 B2 | 3/2025 | Govari et al. |
| 12,246,143 B2 | 3/2025 | Leeflang et al. |
| 12,251,224 B2 | 3/2025 | Selkee et al. |
| 12,256,913 B2 | 3/2025 | Nunan |
| 12,256,984 B2 | 3/2025 | Ku et al. |
| 12,256,985 B2 | 3/2025 | Zhou et al. |
| 12,263,014 B2 | 4/2025 | Tegg et al. |
| 12,263,338 B2 | 4/2025 | de la Rama et al. |
| 12,268,456 B2 | 4/2025 | Harlev et al. |
| 12,290,646 B2 | 5/2025 | Osypka et al. |
| 12,310,715 B2 | 5/2025 | Hoitink et al. |
| D1,078,039 S | 6/2025 | Tegg et al. |
| 12,324,620 B2 | 6/2025 | De La Rama et al. |
| 12,337,124 B2 | 6/2025 | Campbell et al. |
| 12,370,346 B2 | 7/2025 | Davies et al. |
| 2002/0165484 A1 | 11/2002 | Bowe et al. |
| 2002/0177869 A1* | 11/2002 | Eidenschink ... A61M 25/09041 606/194 |
| 2005/0096590 A1* | 5/2005 | Gullickson ....... A61M 25/0136 604/95.04 |
| 2005/0222554 A1* | 10/2005 | Wallace .................. A61B 8/12 606/1 |
| 2008/0091169 A1* | 4/2008 | Heideman ......... A61M 25/0012 604/528 |
| 2011/0306900 A1* | 12/2011 | Whittaker ....... A61M 25/09041 600/585 |
| 2014/0100639 A1 | 4/2014 | Lee et al. |
| 2015/0001191 A1 | 1/2015 | Lee et al. |
| 2015/0335861 A1* | 11/2015 | Osypka ............. A61M 25/0136 604/95.04 |
| 2016/0213423 A1 | 7/2016 | Kauphusman et al. |
| 2016/0278851 A1 | 9/2016 | Mannion et al. |
| 2016/0331933 A1 | 11/2016 | Knutsen |
| 2017/0143940 A1* | 5/2017 | Flygare ............. A61M 25/0136 |
| 2017/0319269 A1 | 11/2017 | Oliverius et al. |
| 2017/0367756 A1 | 12/2017 | Sliwa et al. |
| 2018/0042667 A1 | 2/2018 | Pappone et al. |
| 2018/0085064 A1 | 3/2018 | Auerbach et al. |
| 2018/0161093 A1 | 6/2018 | Basu et al. |
| 2018/0214669 A1* | 8/2018 | Davies .............. A61M 25/0147 |
| 2018/0229030 A1 | 8/2018 | Dubuclet et al. |
| 2018/0369574 A1 | 12/2018 | Dubuclet et al. |
| 2019/0009052 A1 | 1/2019 | Oliverius et al. |
| 2019/0038873 A1 | 2/2019 | Schultheis et al. |
| 2019/0111238 A1 | 4/2019 | Schultz et al. |
| 2019/0125378 A1 | 5/2019 | Shelton, IV et al. |
| 2019/0192826 A1 | 6/2019 | Wada |
| 2020/0000359 A1 | 1/2020 | de la Rama et al. |
| 2020/0054391 A1 | 2/2020 | Litscher et al. |
| 2020/0069365 A1 | 3/2020 | Harlev et al. |
| 2020/0077908 A1 | 3/2020 | Hagfors et al. |
| 2020/0113469 A1 | 4/2020 | Sahadevan et al. |
| 2020/0121894 A1 | 4/2020 | Prabhu et al. |
| 2020/0138378 A1 | 5/2020 | de la Rama et al. |
| 2020/0205737 A1 | 7/2020 | Beeckler |
| 2020/0214635 A1 | 7/2020 | Dahlen et al. |
| 2020/0229866 A1 | 7/2020 | Harlev et al. |
| 2020/0253496 A1 | 8/2020 | Deno et al. |
| 2020/0305744 A1 | 10/2020 | Weerakoon et al. |
| 2020/0345262 A1 | 11/2020 | Selkee et al. |
| 2020/0360657 A1 | 11/2020 | Ganske |
| 2020/0398026 A1 | 12/2020 | Castelli et al. |
| 2020/0405166 A1 | 12/2020 | Wu et al. |
| 2021/0015551 A1 | 1/2021 | Fuentes-ortega et al. |
| 2021/0038860 A1 | 2/2021 | Mintz et al. |

(56) References Cited

U.S. PATENT DOCUMENTS

| | | |
|---|---|---|
| 2021/0052854 A1* | 2/2021 | Tavallaei .......... A61M 25/0147 |
| 2021/0059745 A1 | 3/2021 | Highsmith |
| 2021/0077183 A1 | 3/2021 | Basu et al. |
| 2021/0085920 A1 | 3/2021 | Roberts et al. |
| 2021/0085921 A1 | 3/2021 | Roberts et al. |
| 2021/0121231 A1 | 4/2021 | Basu et al. |
| 2021/0145342 A1 | 5/2021 | Wang |
| 2021/0153932 A1 | 5/2021 | Voth et al. |
| 2021/0187246 A1 | 6/2021 | Houck |
| 2021/0204871 A1 | 7/2021 | Goedeke et al. |
| 2021/0267693 A1 | 9/2021 | Deno et al. |
| 2021/0268234 A1 | 9/2021 | Helgeson et al. |
| 2021/0298656 A1 | 9/2021 | Wu et al. |
| 2021/0361216 A1 | 11/2021 | Hoitink et al. |
| 2021/0361428 A1 | 11/2021 | Dixon |
| 2021/0369132 A1 | 12/2021 | Van Niekerk et al. |
| 2021/0369338 A1 | 12/2021 | Govari et al. |
| 2021/0369339 A1 | 12/2021 | Salazar et al. |
| 2021/0370022 A1 | 12/2021 | Bean et al. |
| 2021/0401345 A1 | 12/2021 | Wu et al. |
| 2021/0402148 A1 | 12/2021 | Beeckler et al. |
| 2022/0023594 A1 | 1/2022 | Pai |
| 2022/0047847 A1* | 2/2022 | Gomez .............. A61B 17/0057 |
| 2022/0054066 A1 | 2/2022 | Solis |
| 2022/0054198 A1 | 2/2022 | Tegg et al. |
| 2022/0061727 A1 | 3/2022 | Olson et al. |
| 2022/0071704 A1 | 3/2022 | Le |
| 2022/0079496 A1 | 3/2022 | Squires et al. |
| 2022/0110675 A1 | 4/2022 | Govari et al. |
| 2022/0126063 A1 | 4/2022 | Weber |
| 2022/0175445 A1 | 6/2022 | Sutermeister et al. |
| 2022/0193373 A1 | 6/2022 | Clark et al. |
| 2022/0225941 A1 | 7/2022 | Smaill et al. |
| 2022/0265345 A1 | 8/2022 | Gottsche et al. |
| 2022/0273913 A1 | 9/2022 | Worley et al. |
| 2022/0313353 A1 | 10/2022 | Palushi et al. |
| 2022/0313961 A1 | 10/2022 | Tang |
| 2022/0331553 A1 | 10/2022 | Strom et al. |
| 2022/0354568 A1 | 11/2022 | Pappone et al. |
| 2022/0361942 A1 | 11/2022 | Lichter et al. |
| 2022/0370119 A1 | 11/2022 | Govari et al. |
| 2022/0370121 A1 | 11/2022 | Highsmith |
| 2022/0370122 A1 | 11/2022 | Smail |
| 2022/0370792 A1 | 11/2022 | de la Rama et al. |
| 2022/0387012 A1 | 12/2022 | Nunan |
| 2022/0387099 A1 | 12/2022 | Cohen et al. |
| 2022/0387100 A1 | 12/2022 | Greenbaum et al. |
| 2022/0395214 A1 | 12/2022 | Altman et al. |
| 2022/0401032 A1 | 12/2022 | Govari et al. |
| 2022/0401693 A1 | 12/2022 | Oliverius et al. |
| 2022/0409860 A1 | 12/2022 | Castelli et al. |
| 2023/0000415 A1 | 1/2023 | Olson |
| 2023/0000547 A1 | 1/2023 | Viswanathan et al. |
| 2023/0000548 A1 | 1/2023 | Viswanathan |
| 2023/0000550 A1 | 1/2023 | Nedved et al. |
| 2023/0001148 A1 | 1/2023 | Sharma |
| 2023/0008044 A1 | 1/2023 | Rao et al. |
| 2023/0009573 A1 | 1/2023 | Van Niekerk et al. |
| 2023/0011509 A1 | 1/2023 | Sterrett et al. |
| 2023/0012307 A1 | 1/2023 | Harlev et al. |
| 2023/0024690 A1 | 1/2023 | Cohen et al. |
| 2023/0028549 A1 | 1/2023 | Maierhofer et al. |
| 2023/0029648 A1 | 2/2023 | Niekerk et al. |
| 2023/0033444 A1 | 2/2023 | Knighton et al. |
| 2023/0035917 A1 | 2/2023 | Gutbrod et al. |
| 2023/0043627 A1 | 2/2023 | Tang et al. |
| 2023/0043978 A1 | 2/2023 | Govari |
| 2023/0046955 A1 | 2/2023 | Akagane |
| 2023/0049942 A1 | 2/2023 | Narayan et al. |
| 2023/0052130 A1 | 2/2023 | Govari et al. |
| 2023/0053064 A1 | 2/2023 | Altmann |
| 2023/0055089 A1 | 2/2023 | Govari et al. |
| 2023/0064082 A1 | 3/2023 | Sun et al. |
| 2023/0078216 A1 | 3/2023 | Govari |
| 2023/0083615 A1 | 3/2023 | Nguyen et al. |
| 2023/0084626 A1 | 3/2023 | Grunewald |
| 2023/0105390 A1 | 4/2023 | Gutbrod et al. |
| 2023/0105973 A1 | 4/2023 | Gutbrod et al. |
| 2023/0114222 A1 | 4/2023 | Esguerra Wilczynski et al. |
| 2023/0121397 A1 | 4/2023 | Oliverius et al. |
| 2023/0123266 A1 | 4/2023 | Castelli et al. |
| 2023/0149069 A1 | 5/2023 | Van Niekerk et al. |
| 2023/0149070 A1 | 5/2023 | Olson et al. |
| 2023/0149675 A1 | 5/2023 | Leung et al. |
| 2023/0172611 A1 | 6/2023 | Biscarrat et al. |
| 2023/0172659 A1 | 6/2023 | Olson et al. |
| 2023/0172661 A1 | 6/2023 | Harlev et al. |
| 2023/0190166 A1 | 6/2023 | Spector |
| 2023/0190198 A1 | 6/2023 | Pederson et al. |
| 2023/0190369 A1 | 6/2023 | Caples et al. |
| 2023/0200894 A1 | 6/2023 | Rodriguez et al. |
| 2023/0200895 A1 | 6/2023 | Ebrahimi et al. |
| 2023/0210433 A1 | 7/2023 | Abbas et al. |
| 2023/0248943 A1 | 8/2023 | Avivi |
| 2023/0264031 A1 | 8/2023 | Harlev et al. |
| 2023/0302256 A1* | 9/2023 | Welter .............. A61M 25/0147 |
| 2023/0329618 A1 | 10/2023 | Wu et al. |
| 2023/0329784 A1 | 10/2023 | Stewart et al. |
| 2023/0404657 A1 | 12/2023 | Olson |
| 2023/0405338 A1 | 12/2023 | Botzer |
| 2023/0414156 A1 | 12/2023 | Liu et al. |
| 2024/0008920 A1 | 1/2024 | Govari et al. |
| 2024/0033470 A1 | 2/2024 | Olson et al. |
| 2024/0057939 A1 | 2/2024 | Wang |
| 2024/0081712 A1 | 3/2024 | Selkee et al. |
| 2024/0081905 A1 | 3/2024 | Corvi et al. |
| 2024/0123191 A1 | 4/2024 | Highsmith et al. |
| 2024/0173070 A1 | 5/2024 | Selkee et al. |
| 2024/0198054 A1 | 6/2024 | Schultz |
| 2024/0206966 A1 | 6/2024 | Kelly et al. |
| 2024/0207578 A1 | 6/2024 | Soltis et al. |
| 2024/0225726 A1 | 7/2024 | Govari et al. |
| 2024/0245360 A1 | 7/2024 | Gliner et al. |
| 2024/0252815 A1 | 8/2024 | de la Rama et al. |
| 2024/0277277 A1 | 8/2024 | Hoitink et al. |
| 2024/0306900 A1 | 9/2024 | Thissen et al. |
| 2024/0325691 A1 | 10/2024 | Bogusky |
| 2024/0350063 A1 | 10/2024 | Olson et al. |
| 2024/0350070 A1 | 10/2024 | Rodriguez |
| 2024/0366299 A1 | 11/2024 | Dando et al. |
| 2024/0366301 A1 | 11/2024 | Govari et al. |
| 2024/0415438 A1 | 12/2024 | Wu et al. |
| 2024/0423707 A1 | 12/2024 | Govari et al. |
| 2025/0009272 A1 | 1/2025 | de la Rama et al. |
| 2025/0017648 A1 | 1/2025 | Kim |
| 2025/0025231 A1 | 1/2025 | Oliverius et al. |
| 2025/0025643 A1 | 1/2025 | Sigmon, Jr. et al. |
| 2025/0032028 A1 | 1/2025 | Deno et al. |
| 2025/0032181 A1 | 1/2025 | Harlev et al. |
| 2025/0032749 A1 | 1/2025 | Tao et al. |
| 2025/0040853 A1 | 2/2025 | Wu et al. |
| 2025/0040889 A1 | 2/2025 | Smaill et al. |
| 2025/0040955 A1 | 2/2025 | Murray et al. |
| 2025/0043590 A1 | 2/2025 | Furseth et al. |
| 2025/0049460 A1 | 2/2025 | Worrell et al. |
| 2025/0057595 A1 | 2/2025 | Narayan et al. |
| 2025/0064430 A1 | 2/2025 | Mantri et al. |
| 2025/0064585 A1 | 2/2025 | Vidlund et al. |
| 2025/0072897 A1 | 3/2025 | Reu et al. |
| 2025/0082438 A1 | 3/2025 | Seeralan et al. |
| 2025/0082901 A1 | 3/2025 | Govari et al. |
| 2025/0082903 A1 | 3/2025 | Hsueh et al. |
| 2025/0090070 A1 | 3/2025 | Wu et al. |
| 2025/0090151 A1 | 3/2025 | Pedersen et al. |
| 2025/0090225 A1 | 3/2025 | Savastano et al. |
| 2025/0090807 A1 | 3/2025 | Padilla et al. |
| 2025/0099176 A1 | 3/2025 | Kim et al. |
| 2025/0152104 A1 | 5/2025 | Tegg et al. |
| 2025/0152932 A1 | 5/2025 | de la Rama et al. |
| 2025/0160942 A1 | 5/2025 | Ku et al. |

(56) References Cited

U.S. PATENT DOCUMENTS

2025/0185968 A1  6/2025  Salazar et al.
2025/0185969 A1  6/2025  Selkee et al.

FOREIGN PATENT DOCUMENTS

| | | |
|---|---|---|
| CA | 2397432 A1 | 8/2001 |
| CN | 101927053 B | 1/2015 |
| CN | 103157168 B | 4/2015 |
| CN | 106859765 A | 6/2017 |
| CN | 106901831 A | 6/2017 |
| CN | 206880930 U | 1/2018 |
| CN | 104958824 B | 12/2018 |
| CN | 104434083 B | 4/2019 |
| CN | 104968261 B | 5/2019 |
| CN | 105592778 B | 7/2019 |
| CN | 105960200 B | 8/2019 |
| CN | 105451680 B | 10/2019 |
| CN | 110536646 A | 12/2019 |
| CN | 110604860 A | 12/2019 |
| CN | 105960201 B | 3/2020 |
| CN | 111225627 A | 6/2020 |
| CN | 111227929 A | 6/2020 |
| CN | 111374755 A | 7/2020 |
| CN | 111432739 A | 7/2020 |
| CN | 111657866 A | 9/2020 |
| CN | 111839499 A | 10/2020 |
| CN | 106264715 B | 11/2020 |
| CN | 106264716 B | 11/2020 |
| CN | 112040861 A | 12/2020 |
| CN | 212940976 U | 4/2021 |
| CN | 106308790 B | 6/2021 |
| CN | 107529958 B | 7/2021 |
| CN | 109310469 B | 7/2021 |
| CN | 213665310 U | 7/2021 |
| CN | 213821695 U | 7/2021 |
| CN | 109641121 B | 9/2021 |
| CN | 109952123 B | 9/2021 |
| CN | 110545874 B | 9/2021 |
| CN | 110559544 B | 9/2021 |
| CN | 113425304 A | 9/2021 |
| CN | 105615994 B | 10/2021 |
| CN | 109963610 B | 11/2021 |
| CN | 113939327 A | 1/2022 |
| CN | 108289709 B | 3/2022 |
| CN | 114126522 A | 3/2022 |
| CN | 114146289 A | 3/2022 |
| CN | 114177483 A | 3/2022 |
| CN | 114343831 A | 4/2022 |
| CN | 114375211 A | 4/2022 |
| CN | 216257368 U | 4/2022 |
| CN | 114424971 A | 5/2022 |
| CN | 111246907 B | 7/2022 |
| CN | 114727815 A | 7/2022 |
| CN | 114828745 A | 7/2022 |
| CN | 107773300 B | 8/2022 |
| CN | 108567424 B | 8/2022 |
| CN | 114903491 A | 8/2022 |
| CN | 106859638 B | 10/2022 |
| CN | 108283520 B | 10/2022 |
| CN | 110547865 B | 10/2022 |
| CN | 115137944 A | 10/2022 |
| CN | 107343816 B | 11/2022 |
| CN | 113545841 B | 11/2022 |
| CN | 115281680 A | 11/2022 |
| CN | 115363746 A | 11/2022 |
| CN | 115364333 A | 11/2022 |
| CN | 115379873 A | 11/2022 |
| CN | 217793303 U | 11/2022 |
| CN | 115426941 A | 12/2022 |
| CN | 115444544 A | 12/2022 |
| CN | 115444549 A | 12/2022 |
| CN | 115461007 A | 12/2022 |
| CN | 115500932 A | 12/2022 |
| CN | 115500933 A | 12/2022 |
| CN | 115590606 A | 1/2023 |
| CN | 115590608 A | 1/2023 |
| CN | 115666700 A | 1/2023 |
| CN | 107343784 B | 2/2023 |
| CN | 115697221 A | 2/2023 |
| CN | 115702823 A | 2/2023 |
| CN | 115768346 A | 3/2023 |
| CN | 115886978 A | 4/2023 |
| CN | 115942915 A | 4/2023 |
| CN | 115990309 A | 4/2023 |
| CN | 110520067 B | 5/2023 |
| CN | 111225627 B | 5/2023 |
| CN | 116135163 A | 5/2023 |
| CN | 116137804 A | 5/2023 |
| CN | 116157084 A | 5/2023 |
| CN | 116157174 A | 5/2023 |
| CN | 116158839 A | 5/2023 |
| CN | 106419897 B | 6/2023 |
| CN | 111065350 B | 6/2023 |
| CN | 116234511 A | 6/2023 |
| CN | 116250914 A | 6/2023 |
| CN | 116327346 A | 6/2023 |
| CN | 109259854 B | 10/2023 |
| CN | 111657866 B | 10/2023 |
| CN | 117355271 A | 1/2024 |
| CN | 117396150 A | 1/2024 |
| CN | 114209331 B | 2/2024 |
| CN | 117597080 A | 2/2024 |
| CN | 111836579 B | 3/2024 |
| CN | 112704546 B | 3/2024 |
| CN | 117942483 A | 4/2024 |
| CN | 117958829 A | 5/2024 |
| CN | 115379873 B | 6/2024 |
| CN | 118234442 A | 6/2024 |
| CN | 118251185 A | 6/2024 |
| CN | 111096749 B | 7/2024 |
| CN | 113164127 B | 7/2024 |
| CN | 118384409 A | 7/2024 |
| CN | 113993572 B | 8/2024 |
| CN | 114040724 B | 8/2024 |
| CN | 111683581 B | 9/2024 |
| CN | 112040861 B | 9/2024 |
| CN | 118697365 A | 9/2024 |
| CN | 118715039 A | 9/2024 |
| CN | 111683614 B | 10/2024 |
| CN | 112121284 B | 11/2024 |
| CN | 113226443 B | 12/2024 |
| CN | 111374755 B | 1/2025 |
| CN | 111436928 B | 1/2025 |
| CN | 111918606 B | 1/2025 |
| CN | 112969498 B | 1/2025 |
| CN | 113543728 B | 1/2025 |
| CN | 113693716 B | 1/2025 |
| CN | 114340535 B | 1/2025 |
| CN | 115284943 B | 1/2025 |
| CN | 115338627 B | 1/2025 |
| CN | 111691972 B | 2/2025 |
| CN | 112278762 B | 2/2025 |
| CN | 112520267 B | 2/2025 |
| CN | 112674068 B | 2/2025 |
| CN | 119385661 A | 2/2025 |
| CN | 119455229 A | 2/2025 |
| CN | 111462635 B | 3/2025 |
| CN | 111994108 B | 3/2025 |
| CN | 112207374 B | 3/2025 |
| CN | 119607406 A | 3/2025 |
| CN | 112040860 B | 5/2025 |
| CN | 114423344 B | 5/2025 |
| CN | 111374756 B | 6/2025 |
| CN | 112135576 B | 6/2025 |
| CN | 115461007 B | 6/2025 |
| DE | 60105973 T2 | 10/2005 |
| EP | 0889744 B1 | 1/2004 |
| EP | 1250171 B1 | 9/2004 |
| EP | 1254641 B1 | 11/2008 |
| EP | 1690564 B1 | 4/2009 |
| EP | 1723981 B1 | 8/2010 |
| EP | 2135634 B1 | 10/2011 |
| EP | 2018196 B1 | 4/2012 |
| EP | 2018203 B1 | 6/2012 |

(56) References Cited

FOREIGN PATENT DOCUMENTS

| | | |
|---|---|---|
| EP | 1814450 B1 | 1/2013 |
| EP | 2269532 B1 | 3/2013 |
| EP | 2604306 B1 | 1/2014 |
| EP | 2752153 A1 | 7/2014 |
| EP | 2915555 A1 | 9/2015 |
| EP | 1968679 B1 | 9/2016 |
| EP | 2241279 B1 | 9/2016 |
| EP | 3115076 A4 | 10/2017 |
| EP | 3117863 A4 | 10/2017 |
| EP | 3030182 B1 | 1/2018 |
| EP | 3111871 B1 | 3/2018 |
| EP | 3111872 B1 | 4/2018 |
| EP | 3057488 B1 | 5/2018 |
| EP | 2848226 B1 | 7/2018 |
| EP | 3363397 A1 | 8/2018 |
| EP | 3391928 A1 | 10/2018 |
| EP | 3122276 B1 | 11/2018 |
| EP | 3398549 A1 | 11/2018 |
| EP | 1759668 B1 | 12/2018 |
| EP | 3037122 B1 | 12/2018 |
| EP | 2234537 B1 | 1/2019 |
| EP | 2569040 B1 | 2/2019 |
| EP | 3023052 B1 | 3/2019 |
| EP | 3073908 B1 | 4/2019 |
| EP | 3466363 A1 | 4/2019 |
| EP | 2550989 B1 | 6/2019 |
| EP | 3512589 A1 | 7/2019 |
| EP | 3512590 A1 | 7/2019 |
| EP | 3527125 A1 | 8/2019 |
| EP | 3531903 A1 | 9/2019 |
| EP | 3581229 A1 | 12/2019 |
| EP | 3434218 B1 | 2/2020 |
| EP | 2908723 B1 | 3/2020 |
| EP | 3335658 B1 | 4/2020 |
| EP | 3073907 B1 | 6/2020 |
| EP | 3673851 A1 | 7/2020 |
| EP | 3114987 B1 | 8/2020 |
| EP | 3178516 B1 | 9/2020 |
| EP | 3708104 A1 | 9/2020 |
| EP | 3711662 A1 | 9/2020 |
| EP | 3721796 A1 | 10/2020 |
| EP | 3733103 A1 | 11/2020 |
| EP | 3738508 A1 | 11/2020 |
| EP | 3738509 A1 | 11/2020 |
| EP | 3340916 B1 | 12/2020 |
| EP | 3579908 B1 | 12/2020 |
| EP | 3749195 A1 | 12/2020 |
| EP | 3750475 A1 | 12/2020 |
| EP | 3768185 A1 | 1/2021 |
| EP | 2155301 B1 | 4/2021 |
| EP | 3432820 B1 | 4/2021 |
| EP | 3476331 B1 | 5/2021 |
| EP | 3579758 B1 | 5/2021 |
| EP | 2809254 B1 | 6/2021 |
| EP | 3508245 B1 | 7/2021 |
| EP | 3858277 A1 | 8/2021 |
| EP | 3892221 A1 | 10/2021 |
| EP | 3902461 A1 | 11/2021 |
| EP | 3915477 A1 | 12/2021 |
| EP | 3932343 A4 | 1/2022 |
| EP | 3791820 B9 | 4/2022 |
| EP | 3986520 A1 | 4/2022 |
| EP | 3991680 A2 | 5/2022 |
| EP | 4000506 A1 | 5/2022 |
| EP | 3153124 B1 | 7/2022 |
| EP | 3860447 A4 | 7/2022 |
| EP | 4025112 A1 | 7/2022 |
| EP | 4031007 A1 | 7/2022 |
| EP | 4039215 A1 | 8/2022 |
| EP | 4041112 A1 | 8/2022 |
| EP | 3363397 B1 | 9/2022 |
| EP | 3673944 B1 | 9/2022 |
| EP | 3915501 B1 | 9/2022 |
| EP | 3949848 A4 | 9/2022 |
| EP | 4076193 A1 | 10/2022 |
| EP | 4078255 A1 | 10/2022 |
| EP | 4079365 A2 | 10/2022 |
| EP | 3609414 B1 | 11/2022 |
| EP | 4088676 A1 | 11/2022 |
| EP | 4091565 A1 | 11/2022 |
| EP | 4091569 A1 | 11/2022 |
| EP | 4093274 A1 | 11/2022 |
| EP | 4096545 A1 | 12/2022 |
| EP | 4101372 A1 | 12/2022 |
| EP | 4101375 A1 | 12/2022 |
| EP | 4101383 A1 | 12/2022 |
| EP | 4104763 A1 | 12/2022 |
| EP | 4106625 A1 | 12/2022 |
| EP | 4106853 A2 | 12/2022 |
| EP | 2844193 B1 | 1/2023 |
| EP | 3100696 B1 | 1/2023 |
| EP | 3166524 B1 | 1/2023 |
| EP | 3946123 A4 | 1/2023 |
| EP | 4079365 A3 | 1/2023 |
| EP | 4115832 A1 | 1/2023 |
| EP | 4115833 A1 | 1/2023 |
| EP | 4115936 A1 | 1/2023 |
| EP | 4120963 A1 | 1/2023 |
| EP | 4122414 A1 | 1/2023 |
| EP | 4134032 A1 | 2/2023 |
| EP | 4137080 A1 | 2/2023 |
| EP | 3115076 B1 | 3/2023 |
| EP | 3658054 B1 | 3/2023 |
| EP | 4144397 A1 | 3/2023 |
| EP | 4157420 A1 | 4/2023 |
| EP | 4159124 A1 | 4/2023 |
| EP | 4164519 A1 | 4/2023 |
| EP | 4167886 A1 | 4/2023 |
| EP | 4179991 A1 | 5/2023 |
| EP | 4181810 A1 | 5/2023 |
| EP | 4185224 A1 | 5/2023 |
| EP | 4185225 A1 | 5/2023 |
| EP | 2803329 B1 | 6/2023 |
| EP | 3015064 B1 | 6/2023 |
| EP | 3141183 B1 | 6/2023 |
| EP | 3398549 B1 | 6/2023 |
| EP | 3768185 B1 | 6/2023 |
| EP | 4190232 A1 | 6/2023 |
| EP | 4190257 A2 | 6/2023 |
| EP | 4193947 A1 | 6/2023 |
| EP | 4201356 A2 | 6/2023 |
| EP | 4218579 A1 | 8/2023 |
| EP | 2816966 B1 | 10/2023 |
| EP | 3113671 B1 | 10/2023 |
| EP | 3681427 B1 | 10/2023 |
| EP | 3738509 B1 | 10/2023 |
| EP | 3749195 B1 | 10/2023 |
| EP | 3209234 B1 | 11/2023 |
| EP | 3527125 B1 | 11/2023 |
| EP | 3721796 B1 | 11/2023 |
| EP | 3731747 B1 | 11/2023 |
| EP | 3998935 B1 | 11/2023 |
| EP | 4091547 B1 | 11/2023 |
| EP | 4233699 A3 | 11/2023 |
| EP | 4272631 A2 | 11/2023 |
| EP | 4291123 A1 | 12/2023 |
| EP | 3192442 B1 | 1/2024 |
| EP | 3892221 B1 | 1/2024 |
| EP | 4298995 A2 | 1/2024 |
| EP | 3738508 B1 | 2/2024 |
| EP | 4137051 B1 | 3/2024 |
| EP | 4340762 A1 | 3/2024 |
| EP | 3124069 B1 | 4/2024 |
| EP | 4003234 B9 | 4/2024 |
| EP | 4159124 B1 | 4/2024 |
| EP | 3943139 B1 | 5/2024 |
| EP | 4167886 B1 | 5/2024 |
| EP | 4353171 A3 | 5/2024 |
| EP | 4360572 A1 | 5/2024 |
| EP | 4362831 A1 | 5/2024 |
| EP | 4364680 A2 | 5/2024 |
| EP | 4364765 A2 | 5/2024 |
| EP | 4370064 A1 | 5/2024 |
| EP | 4370187 A1 | 5/2024 |

(56) References Cited

FOREIGN PATENT DOCUMENTS

| | | | |
|---|---|---|---|
| EP | 3498156 B1 | 6/2024 | |
| EP | 4044947 B1 | 6/2024 | |
| EP | 4344722 A3 | 6/2024 | |
| EP | 4376745 A1 | 6/2024 | |
| EP | 4378515 A2 | 6/2024 | |
| EP | 3573559 B1 | 7/2024 | |
| EP | 3673851 | 7/2024 | |
| EP | 3834728 | 7/2024 | |
| EP | 4181810 A4 | 7/2024 | |
| EP | 4272631 A3 | 7/2024 | |
| EP | 4392113 A1 | 7/2024 | |
| EP | 3603493 B1 | 8/2024 | |
| EP | 3998975 B1 | 8/2024 | |
| EP | 4205685 B1 | 8/2024 | |
| EP | 4378515 A3 | 8/2024 | |
| EP | 4412547 A1 | 8/2024 | |
| EP | 4412549 A1 | 8/2024 | |
| EP | 4417112 A2 | 8/2024 | |
| EP | 3629964 B1 | 9/2024 | |
| EP | 4427666 A2 | 9/2024 | |
| EP | 4433133 A1 | 9/2024 | |
| EP | 4433141 A1 | 9/2024 | |
| EP | 3184035 B1 | 10/2024 | |
| EP | 4091569 | 10/2024 | |
| EP | 4218579 B1 | 10/2024 | |
| EP | 4444195 A1 | 10/2024 | |
| EP | 4452069 A1 | 10/2024 | |
| EP | 3915477 B1 | 11/2024 | |
| EP | 4193947 B1 | 11/2024 | |
| EP | 4417112 A3 | 11/2024 | |
| EP | 4427666 A3 | 11/2024 | |
| EP | 3860447 B1 | 12/2024 | |
| EP | 4101372 B1 | 12/2024 | |
| EP | 4215138 B1 | 12/2024 | |
| EP | 4437989 A3 | 12/2024 | |
| EP | 4477171 A2 | 12/2024 | |
| EP | 3737453 B1 | 1/2025 | |
| EP | 3760152 B1 | 1/2025 | |
| EP | 3957968 B1 | 1/2025 | |
| EP | 4031044 | 1/2025 | |
| EP | 4458292 A3 | 1/2025 | |
| EP | 4482412 A1 | 1/2025 | |
| EP | 4482413 A1 | 1/2025 | |
| EP | 4482564 A2 | 1/2025 | |
| EP | 4489634 A1 | 1/2025 | |
| EP | 4496546 A1 | 1/2025 | |
| EP | 2915555 B1 | 2/2025 | |
| EP | 4031007 B1 | 2/2025 | |
| EP | 4153526 B1 | 2/2025 | |
| EP | 4480435 A3 | 2/2025 | |
| EP | 4483828 A3 | 3/2025 | |
| EP | 4387547 B1 | 5/2025 | |
| EP | 4370187 B1 | 6/2025 | |
| EP | 4555953 A3 | 6/2025 | |
| IN | 201614021431 A | 12/2016 | |
| IN | 201614021450 A | 12/2016 | |
| JP | 4545384 B2 | 7/2010 | |
| JP | 2010533564 A | 10/2010 | |
| JP | 4887810 B2 | 2/2012 | |
| JP | 4940332 B2 | 3/2012 | |
| JP | 4940526 B2 | 3/2012 | |
| JP | 2012055602 A | 3/2012 | |
| JP | 5064493 B2 | 8/2012 | |
| JP | 2012200509 A | 10/2012 | |
| JP | 5154031 B2 | 2/2013 | |
| JP | 5193190 B2 | 5/2013 | |
| JP | 5372314 B2 | 12/2013 | |
| JP | 2014014713 A | 1/2014 | |
| JP | 5550150 B2 | 5/2014 | |
| JP | 2014512934 A | 5/2014 | |
| JP | 2014516669 A * | 7/2014 | ........ A61M 25/0136 |
| JP | 5762697 B2 | 6/2015 | |
| JP | 5856712 B2 | 2/2016 | |
| JP | 5908270 B2 | 4/2016 | |
| JP | 5944331 B2 | 7/2016 | |
| JP | 6050522 B2 | 12/2016 | |
| JP | 6059737 B2 | 12/2016 | |
| JP | 2017012750 A | 1/2017 | |
| JP | 2017038919 A | 2/2017 | |
| JP | 2017051211 A | 3/2017 | |
| JP | 2017104552 A | 6/2017 | |
| JP | 6246742 B2 | 12/2017 | |
| JP | 6342524 B2 | 6/2018 | |
| JP | 6434495 B2 | 12/2018 | |
| JP | 6445509 B2 | 12/2018 | |
| JP | 6445742 B1 | 12/2018 | |
| JP | 6466114 B2 | 2/2019 | |
| JP | 6479005 B2 | 2/2019 | |
| JP | 6515084 B2 | 5/2019 | |
| JP | 6528010 B1 | 6/2019 | |
| JP | 6655655 B2 | 2/2020 | |
| JP | 6693861 B2 | 4/2020 | |
| JP | 2020108766 A | 7/2020 | |
| JP | 6746734 B2 | 8/2020 | |
| JP | 6776021 B2 | 10/2020 | |
| JP | 6776025 B2 | 10/2020 | |
| JP | 6786275 B2 | 11/2020 | |
| JP | 2020537573 A | 12/2020 | |
| JP | 6821812 B2 | 1/2021 | |
| JP | 2021007772 A | 1/2021 | |
| JP | 2021501011 A | 1/2021 | |
| JP | 6843502 B2 | 3/2021 | |
| JP | 2021069921 A | 5/2021 | |
| JP | 6894004 B2 | 6/2021 | |
| JP | 6920312 B2 | 8/2021 | |
| JP | 6926306 B2 | 8/2021 | |
| JP | 6932484 B2 | 8/2021 | |
| JP | 6936872 B2 | 9/2021 | |
| JP | 2021523755 A | 9/2021 | |
| JP | 6970067 B2 | 11/2021 | |
| JP | 6980386 B2 | 12/2021 | |
| JP | 2022020838 A | 2/2022 | |
| JP | 2022063862 A | 4/2022 | |
| JP | 7101228 B2 | 7/2022 | |
| JP | 7102558 B2 | 7/2022 | |
| JP | 7106301 B2 | 7/2022 | |
| JP | 7135202 B2 | 9/2022 | |
| JP | 2022540496 A | 9/2022 | |
| JP | 2022159146 A | 10/2022 | |
| JP | 2022176157 A | 11/2022 | |
| JP | 2022546719 A | 11/2022 | |
| JP | 2022548944 A | 11/2022 | |
| JP | 2022177819 A | 12/2022 | |
| JP | 2022179432 A | 12/2022 | |
| JP | 2022187485 A | 12/2022 | |
| JP | 2022187486 A | 12/2022 | |
| JP | 2022188763 A | 12/2022 | |
| JP | 2023002720 A | 1/2023 | |
| JP | 2023010544 A | 1/2023 | |
| JP | 2023501756 A | 1/2023 | |
| JP | 7220242 B2 | 2/2023 | |
| JP | 7230168 B2 | 2/2023 | |
| JP | 2023024395 A | 2/2023 | |
| JP | 2023026388 A | 2/2023 | |
| JP | 2023506505 A | 2/2023 | |
| JP | 2023507412 A | 2/2023 | |
| JP | 7242665 B2 | 3/2023 | |
| JP | 7242816 B2 | 3/2023 | |
| JP | 7246319 B2 | 3/2023 | |
| JP | 2023027023 A | 3/2023 | |
| JP | 2023027202 A | 3/2023 | |
| JP | 2023033335 A | 3/2023 | |
| JP | 7256621 B2 | 4/2023 | |
| JP | 7262919 B2 | 4/2023 | |
| JP | 2023515798 A | 4/2023 | |
| JP | 2023517284 A | 4/2023 | |
| JP | 7275333 B2 | 5/2023 | |
| JP | 7282759 B2 | 5/2023 | |
| JP | 2023074000 A | 5/2023 | |
| JP | 2023519039 A | 5/2023 | |
| JP | 7292822 B2 | 6/2023 | |
| JP | 2023526907 A | 6/2023 | |
| JP | 2023139173 A | 10/2023 | |
| JP | 7391562 B2 | 11/2023 | |

(56) References Cited

FOREIGN PATENT DOCUMENTS

| | | | |
|---|---|---|---|
| JP | 7394766 B2 | 11/2023 |
| JP | 7400050 B2 | 12/2023 |
| JP | 7423550 B2 | 1/2024 |
| JP | 2024012693 A | 1/2024 |
| JP | 7465944 B2 | 4/2024 |
| JP | 2024059810 A | 5/2024 |
| JP | 2024060605 A | 5/2024 |
| JP | 7493935 B2 | 6/2024 |
| JP | 7499702 B2 | 6/2024 |
| JP | 7512156 B2 | 7/2024 |
| JP | 7514764 B2 | 7/2024 |
| JP | 7515637 B2 | 7/2024 |
| JP | 7516185 B2 | 7/2024 |
| JP | 7523073 B2 | 7/2024 |
| JP | 7523074 B2 | 7/2024 |
| JP | 2024528078 A | 7/2024 |
| JP | 7517994 B2 | 8/2024 |
| JP | 7520967 B2 | 8/2024 |
| JP | 7530317 B2 | 8/2024 |
| JP | 7532506 B2 | 8/2024 |
| JP | 7535097 B2 | 8/2024 |
| JP | 2024103761 A | 8/2024 |
| JP | 7539974 B2 | 9/2024 |
| JP | 7551326 B2 | 9/2024 |
| JP | 2024121015 A | 9/2024 |
| JP | 2024125304 A | 9/2024 |
| JP | 7566503 B2 | 10/2024 |
| JP | 2024536350 A | 10/2024 |
| JP | 2024536352 A | 10/2024 |
| JP | 2024537099 A | 10/2024 |
| JP | 7574276 B2 | 11/2024 |
| JP | 7577739 B2 | 11/2024 |
| JP | 7587597 B2 | 11/2024 |
| JP | 2024156696 A | 11/2024 |
| JP | 2024543437 A | 11/2024 |
| JP | 7592480 B2 | 12/2024 |
| JP | 2024544543 A | 12/2024 |
| JP | 7617073 B2 | 1/2025 |
| JP | 7617103 B2 | 1/2025 |
| JP | 2025013792 A | 1/2025 |
| JP | 7628563 B2 | 2/2025 |
| JP | 7633185 B2 | 2/2025 |
| JP | 7637671 B2 | 2/2025 |
| JP | 7639079 B2 | 2/2025 |
| JP | 2025023950 A | 2/2025 |
| JP | 2025026734 A | 2/2025 |
| JP | 2025026852 A | 2/2025 |
| JP | 2025027101 A | 2/2025 |
| JP | 7635238 B2 | 3/2025 |
| JP | 7640580 B2 | 3/2025 |
| JP | 7641330 B2 | 3/2025 |
| JP | 2025028941 A | 3/2025 |
| JP | 2025036543 A | 3/2025 |
| JP | 2025036738 A | 3/2025 |
| JP | 2025507449 A | 3/2025 |
| JP | 7646980 B2 | 4/2025 |
| JP | 7647478 B2 | 4/2025 |
| JP | 7654796 B2 | 4/2025 |
| JP | 7662472 B2 | 4/2025 |
| JP | 7662473 B2 | 4/2025 |
| JP | 7686646 B2 | 6/2025 |
| RU | 2016124794 A | 12/2017 |
| RU | 2016125763 A | 1/2018 |
| WO | 9843530 A1 | 10/1998 |
| WO | 0168178 A1 | 9/2001 |
| WO | 2008091197 A1 | 7/2008 |
| WO | WO-2015092768 A1 * | 6/2015 | ........ A61M 25/0136 |
| WO | 2017098198 A1 | 6/2017 |
| WO | 2017155867 A1 | 9/2017 |
| WO | 2018053148 A1 | 3/2018 |
| WO | 2018053164 A1 | 3/2018 |
| WO | 2018136741 A1 | 7/2018 |
| WO | 2019195439 A1 | 10/2019 |
| WO | 2019226640 A1 | 11/2019 |
| WO | 2021053482 A1 | 3/2021 |
| WO | 2021053648 A1 | 3/2021 |
| WO | 2021061198 A1 | 4/2021 |
| WO | 2021120853 A1 | 6/2021 |
| WO | 2021183397 A1 | 9/2021 |
| WO | 2021242852 A1 | 12/2021 |
| WO | 2022038546 A1 | 2/2022 |
| WO | 2022148153 A1 | 7/2022 |
| WO | 2022180046 A1 | 9/2022 |
| WO | 2022214870 A1 | 10/2022 |
| WO | 2022246011 A1 | 11/2022 |
| WO | 2022251429 A1 | 12/2022 |
| WO | 2023275848 A1 | 1/2023 |
| WO | 2023278577 A1 | 1/2023 |
| WO | 2023280822 A1 | 1/2023 |
| WO | 2023287289 A1 | 1/2023 |
| WO | 2023007324 A1 | 2/2023 |
| WO | 2023009569 A1 | 2/2023 |
| WO | 2023018741 A1 | 2/2023 |
| WO | 2023028531 A1 | 3/2023 |
| WO | 2023059507 A1 | 4/2023 |
| WO | 2023059509 A1 | 4/2023 |
| WO | 2023086778 A1 | 5/2023 |
| WO | 2023086865 A1 | 5/2023 |
| WO | 2023105322 A1 | 6/2023 |
| WO | 2023122183 A1 | 6/2023 |
| WO | 2023164001 A1 | 8/2023 |

\* cited by examiner

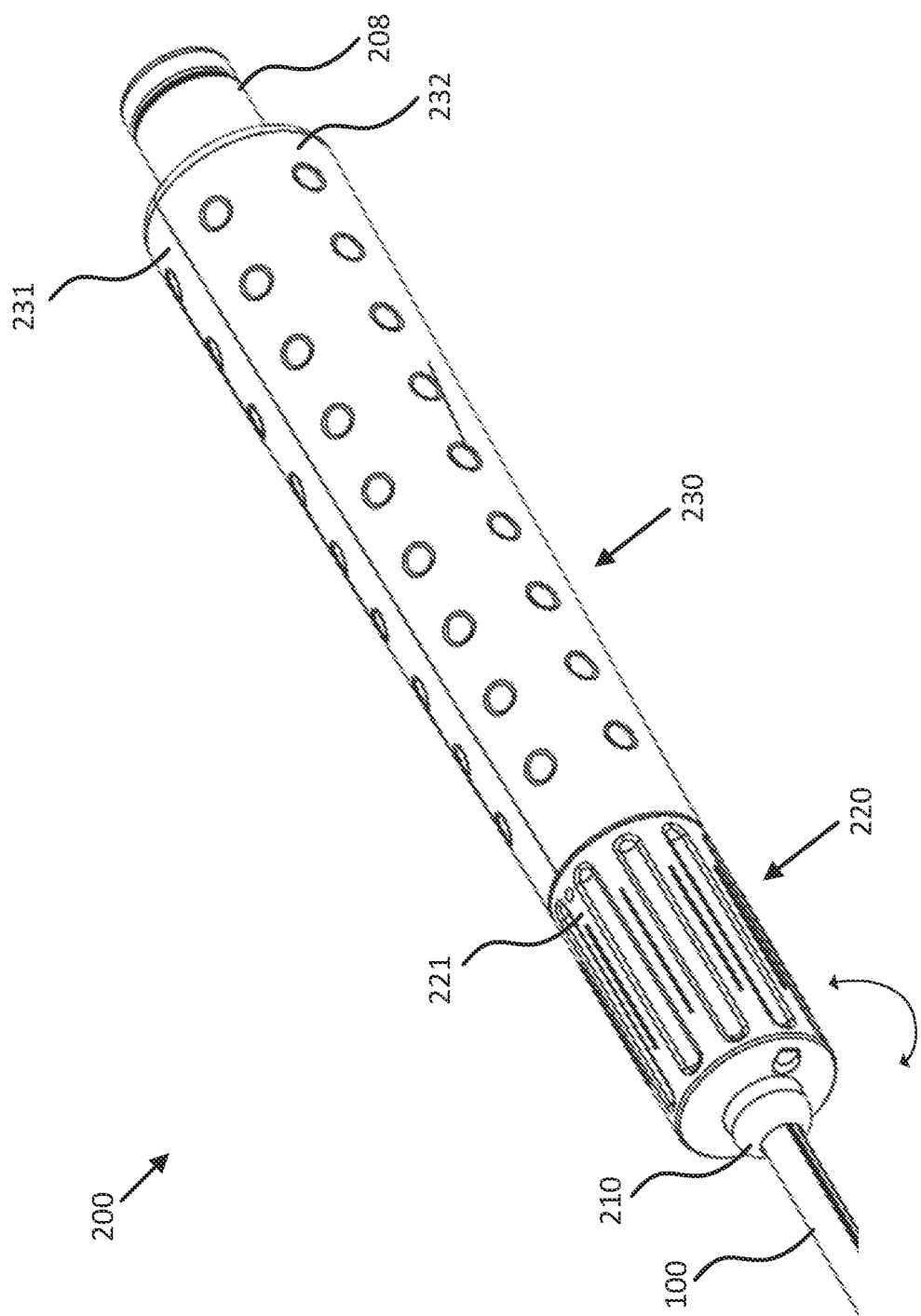

STEERABLE INTRODUCER WITH SLIDE BLOCK DIVIDER

CROSS REFERENCE TO RELATED APPLICATION DATA

The present application claims the benefit under 35 USC § 119(e) of U.S. Provisional Application Nos. 63/323,744 filed Mar. 25, 2022 and 63/396,297 filed Aug. 9, 2022; the full disclosures which are incorporated herein by reference in their entirety for all purposes.

FIELD OF DISCLOSURE

This disclosure relates generally to introducers and methods of using introducers. More particularly, the present disclosure relates to handle assemblies for steerable introducers and steerable sheaths methods of manufacturing handle assemblies for steerable introducers and steerable sheaths, and methods of articulating steerable introducers and steerable sheaths.

BACKGROUND

Catheters are often used for medical procedures such as, for example, diagnostic, therapeutic, and ablative procedures. Typically, a physician advances a catheter through a patient's vasculature to an intended site, such as a site within the patient's heart. A catheter may include one or more electrodes, one or more diagnostic devices, and/or one or more therapeutic devices, which may be used for any suitable medical purpose including, but not limited to, ablation, diagnosis, cardiac mapping, or the like.

For example, ablation therapy may be used to treat various medical conditions. One medical condition in which ablation therapy may be used is the treatment of cardiac arrhythmias. When cardiac tissue is ablated, or at least subjected to ablative energy generated by an ablation generator and delivered by an ablation catheter, lesions form in the cardiac tissue. Electrodes mounted on or in ablation catheters can be used to create tissue necrosis in cardiac tissue to correct conditions such as atrial arrhythmia (including, but not limited to, ectopic atrial tachycardia, atrial fibrillation, and atrial flutter). Arrhythmias can create a variety of dangerous conditions including loss of synchronous atrioventricular contractions and stasis of blood flow. It is believed that the primary cause of atrial arrhythmia is stray electrical signals within the left or right atrium of the heart. An ablation catheter can be used to impart ablative energy (e.g., radiofrequency energy, cryoablation, lasers, chemicals, high-intensity focused ultrasound, etc.) to cardiac tissue to create a lesion in the cardiac tissue that disrupts undesirable electrical pathways and thereby limits or prevents stray electrical signals that lead to arrhythmias.

As another example, electroporation is a non-thermal ablation technique in which electric-fields are applied to induce pore formation in cellular membranes. The electric field may be applied in a pulse train of relatively short duration pulses that last, for example, from a nanosecond to several milliseconds. When electroporation is applied to tissue in an in vivo setting, the cells in the tissue are subjected to a trans-membrane potential to induce the pore formation in the cellular membranes. Electroporation may be reversible (i.e., the temporally-opened pores will reseal) or irreversible (i.e., the pores will remain open), causing cellular destruction. For example, in the field of gene therapy, reversible electroporation is used to accommodate transportation of high molecular weight therapeutic vectors into cells. In other therapeutic applications, irreversible electroporation can be used to induce cell destruction.

Catheters may be introduced through an introducer or sheath. An introducer can be advanced through a patient's vasculature and a diagnostic and/or treatment catheter is then advanced through a lumen of the introducer to the intended site within the patient. The introducer itself may be advanced over a guide wire. The introducer can have an outer diameter small enough to be advanced through the patient's vasculature and a lumen large enough to accommodate advancement of a catheter through the lumen.

A catheter, such as a diagnostic catheter, a treatment catheter, or an introducer can include a steerable section that can be selectively articulated to enhance advancement of the catheter along a path (which is often tortuous) though the patient's vasculature. Typically, the steerable section is located near the distal end of the catheter and one or more pull cables are employed to transmit steering forces from a proximal handle assembly to the steerable section. Examples of introducer with steerable sections are disclosed in U.S. Pat. Nos. 4,817,613 and 7,914,515, which are incorporated herein by reference in their entirety.

BRIEF SUMMARY

A steerable introducer including a handle assembly with slide members and a slide block divider for constraining slide members is described herein. The steerable catheter includes an elongated body including a proximal end, a steerable section, a first deflection lumen extending between the proximal end and the steerable section, and a second deflection lumen extending between the proximal end and the steerable section. Within the first deflection lumen, a first deflection wire is disposed and actuatable to induce deflection of the steerable section of the elongated body in a first direction. Within the second deflection lumen, a second deflection wire is disposed and actuatable to induce deflection of the steerable section of the elongated body in a second direction.

A handle assembly can be coupled to the proximal end of the elongated body. The handle assembly includes a handle housing, a slide chassis disposed within the handle housing, a first slide member drivingly coupled with the first deflection wire, a second slide member drivingly coupled with the second deflection wire, and a slide block divider disposed within the handle housing. An actuation assembly can be drivingly coupled with each of the first slide member and the second slide member. The actuation assembly is operable to simultaneously drive the first slide member distally and the second slide member proximally within the slide compartment, or vice-versa.

The slide block divider and the slide chassis combine to form a slide compartment in which each of the first slide member and the second slide member is slidably disposed. Advantageously, the slide block divider can prevent the first deflection wire and the second deflection wire from crossing each other within the handle housing. The slide block divider can constrain each of the first slide member and the second slide member during translation within the slide compartment to inhibit motion transverse to a longitudinal direction of the slide compartment. The slide block divider is shaped and sized to cooperate with an inner surface of the handle housing facilitating a compact housing assembly. Also, as the slide block divider prevents the deflection wires from cross each other and slides from rising within the housing, no extra force may be applied to the actuation assembly to overcome torque or resistance from deflection wires or the slide members. As such, the user can control the deflection of the elongated shaft section using a single hand. As such, the slide block divider can provide an improved handling of the steerable introducer during medical procedures such as, for example, diagnostic, therapeutic, and ablative procedures.

The slide chassis includes a slide member opening extending along a length of the slide chassis. The opening is configured to accommodate installation of at least one of the first slide member and the second slide member into the slide chassis. The slide chassis includes support edges configured to support the slide block divider. The slide member opening is at least partially defined by the support edges. The slide chassis includes shoulders for locating the slide block divider. The shoulders extend in a plane perpendicular to the support edges at an end close to the distal end of the slide chassis. The slide chassis is substantially cylindrical in shape.

The slide block divider includes a fin extending toward the slide members to prevent the slide members from rotating and to prevent the first deflection wire from crossing with the second deflection wire within the handle housing. The fin is a radially projecting portion that extends from a proximal end of the slide block divider to a distal end of the slide block divider and is disposed between the first slide member and the second slide member. The slide block divider includes an external surface interfaced with an inner surface of the handle housing. The inner surface of the handle housing has a curved shape with one or more ribs spaced from each other and extending along the curved shape. Accordingly, the external surface of the slide block divider has a corresponding curved shape with slots to receive the one or more ribs of the inner surface of the handle housing and to prevent relative motion of the slide block divider with respect to the handle.

The slide block divider can include a pair of rails. Each of the pair of rails extends along a length of the slide block divider and is configured to rest on the slide chassis. The slide block divider increases side walls extending along a length of the slide block divider. Each of the pair of rails is formed on a respective one of the side walls. The side walls of the slide block divider comprise a tail portion configured to butt against a shoulder of the slide chassis to facilitate assembly and to prevent relative motion between the slide block divider and the slide chassis. The slide chassis includes flat side portions extending at least partially along a length of the slide chassis, and inner surfaces of the side walls of the slide block divider contact the flat side portions.

The slide block divider has an extended portion at a proximal end of the slide block divider. The extended portion is received in the gap and prevents the first deflection wire from crossing into the second deflection wire during operation of the steerable introducer. The slide chassis includes a slide member opening extending along a length of the slide chassis. The slide member opening is configured to accommodate installation of at least one of the first slide member and the second slide member into the slide chassis.

The first slide member has an external right-handed thread, and the second slide member has an external left-handed thread. The actuation assembly comprises a rotatable knob having internal threads configured to engage the external right-handed thread and the external left-handed thread. The first slide member includes first slide member distal end side surfaces configured to slide along first slide member side surfaces of the slide block divider to inhibit rotation of the first slide member within the slide compartment. The second slide member includes second slide member distal end side surfaces configured to slide along second slide member side surfaces of the slide block divider to inhibit rotation of the second slide member within the slide compartment. The first slide member includes a first deflection wire channel through which the first deflection wire extends, and the second slide member includes a second deflection wire channel through which the second deflection wire extends. The first slide member and the second slide member are separated by a gap in which a portion of the slide block divider extends.

In some embodiments, the handle assembly further includes a first pin assembly having a first pin disposed at a proximal end of the first deflection wire channel of the first slide member and a second pin assembly having a second pin disposed at a proximal end of the second deflection wire channel of the second slide member. The first deflection wire is coupled to the first pin and the second deflection wire is coupled to the second pin. The handle assembly further includes a slide block divider having a fin extending radially toward the slide members. The fin has a height extending radially down to and above the first pin and the second pin. The height of the fin is constant along a longitudinal axis of the slide block divider. In some embodiments, the fin has a tapered shape to prevent the first pin and the second pin from coming in contact with the fin during sliding of the slide members. In some embodiments, each of the first pin and the second pin includes a textured circumferential surface.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and can or cannot represent actual or preferred values or dimensions. Where applicable, some or all features cannot be illustrated to assist in the description of underlying features. In the drawings:

FIG. 2A is a close-up view illustration of the handle assembly of FIG. 1.

DETAILED DESCRIPTION

Figure 1:
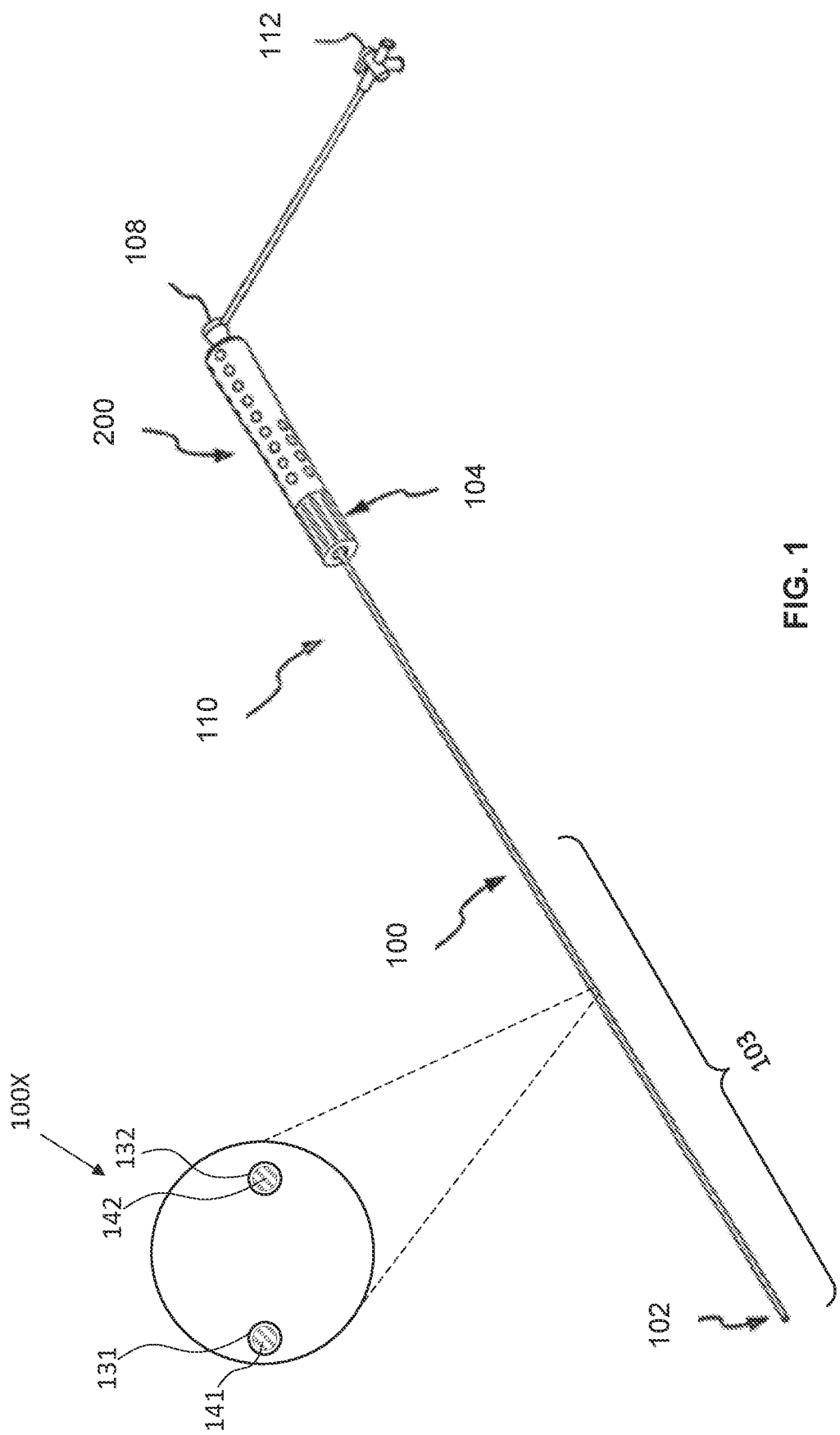
FIG. 1 illustrates an introducer that includes a steerable section and a handle assembly operable to articulate the steerable section, according to some embodiments of the present disclosure.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed embodiment(s). However, it will be apparent to those skilled in the art that the disclosed embodiment(s) can be practiced without those specific details. In some instances, well-known structures and components can be shown in block diagram form in order to avoid obscuring the concepts of the disclosed subject matter.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics can be combined in any suitable manner in one or more embodiments. Further, it is intended that embodiments of the disclosed subject matter cover modifications and variations thereof.

It is to be understood that terms such as "distal," "proximal," "top," "bottom," "front," "side," "length," "inner," and the like that can be used herein merely describe points of reference and do not necessarily limit embodiments of the present disclosure to any particular orientation or configuration. As used herein, "proximal" refers to a direction toward the end of a catheter or an introducer near the clinician and "distal" refers to a direction away from the clinician and (generally) inside the body of a patient. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

The terms "longitudinal," "axial" or "axially" are generally longitudinal as used herein to describe the relative position related to an introducer, a catheter, a introducer handle, or other components of the system herein. For example, "longitudinal" or "axial" indicates an axis passing along a center of a introducer or a catheter from a proximal end to a distal end, or along a center of the introducer handle from a proximal end to a distal end. The term "radial" generally refers to a direction perpendicular to the "axial" direction.

Introducers that include a steerable section and a handle assembly operable for articulating the steerable section are described herein. The catheters can be used in any suitable medical procedure including, but not limited to, diagnostic and/or therapeutic procedures. While the handle assemblies may be described herein as included in an introducer with a steerable section, the handle assemblies can be included in any suitable type catheter such as, for example, diagnostic catheters, therapeutic catheters, and introducer.

Turning now to the figures in which similar reference identifiers are associated with similar elements, FIG. 1 shows an introducer 100 according to some embodiments of the present disclosure. The introducer 100 includes an elongated introducer shaft 110 having a distal end 102, a steerable section 103 disposed adjacent to the distal end 102, and a proximal end 104. The introducer 100 can be configured as any suitable type of catheter including, for example, an introducer, a diagnostic catheter, or a treatment catheter. The introducer 100 includes a handle assembly 200, which is coupled with the introducer shaft 110 at the proximal end 104. As described herein, the handle assembly 200 is operable to selectively articulate the steerable section 103 to accommodate advancement of the introducer shaft 110 through a patient's vasculature and/or retraction of the introducer shaft 110 from the patient's vasculature. In the illustrated embodiment, the introducer 100 is configured as an introducer and further includes a connection hub 108 operably connected to an inner lumen (not shown) within the handle assembly 200 for insertion of another catheter (e.g., a diagnostic catheter, a treatment catheter), fluids, or any other suitable medical substances or medical devices known to those of ordinary skill in the art. The introducer 100 further includes a valve 112 operably connected to the connection hub 108. An example of an introducer is discussed in detail in U.S. Pat. No. 7,914,515, which is incorporated herein in its entirety by reference.

Referring now to cross-section portion 100X shown in FIG. 1, the introducer shaft 110 includes a first deflection lumen 131, a first deflection wire 141, a second deflection lumen 132, and a second deflection wire 142. Each of the first deflection lumen 131 and the second deflection extends between the proximal end 104 and the steerable section 103 (or the distal end 102). The first deflection wire 141 extends within the first deflection lumen 131. The first deflection wire 141 is actuatable via the handle assembly 200 to induce deflection of the steerable section 103 in a first direction (e.g., left or up). The second deflection wire 142 extends within the second deflection lumen 132. The second deflection wire 142 is actuatable via the handle assembly 200 to induce deflection of the steerable section 103 in a second direction (e.g., right or down), opposite of the first direction.

Figure 2B:
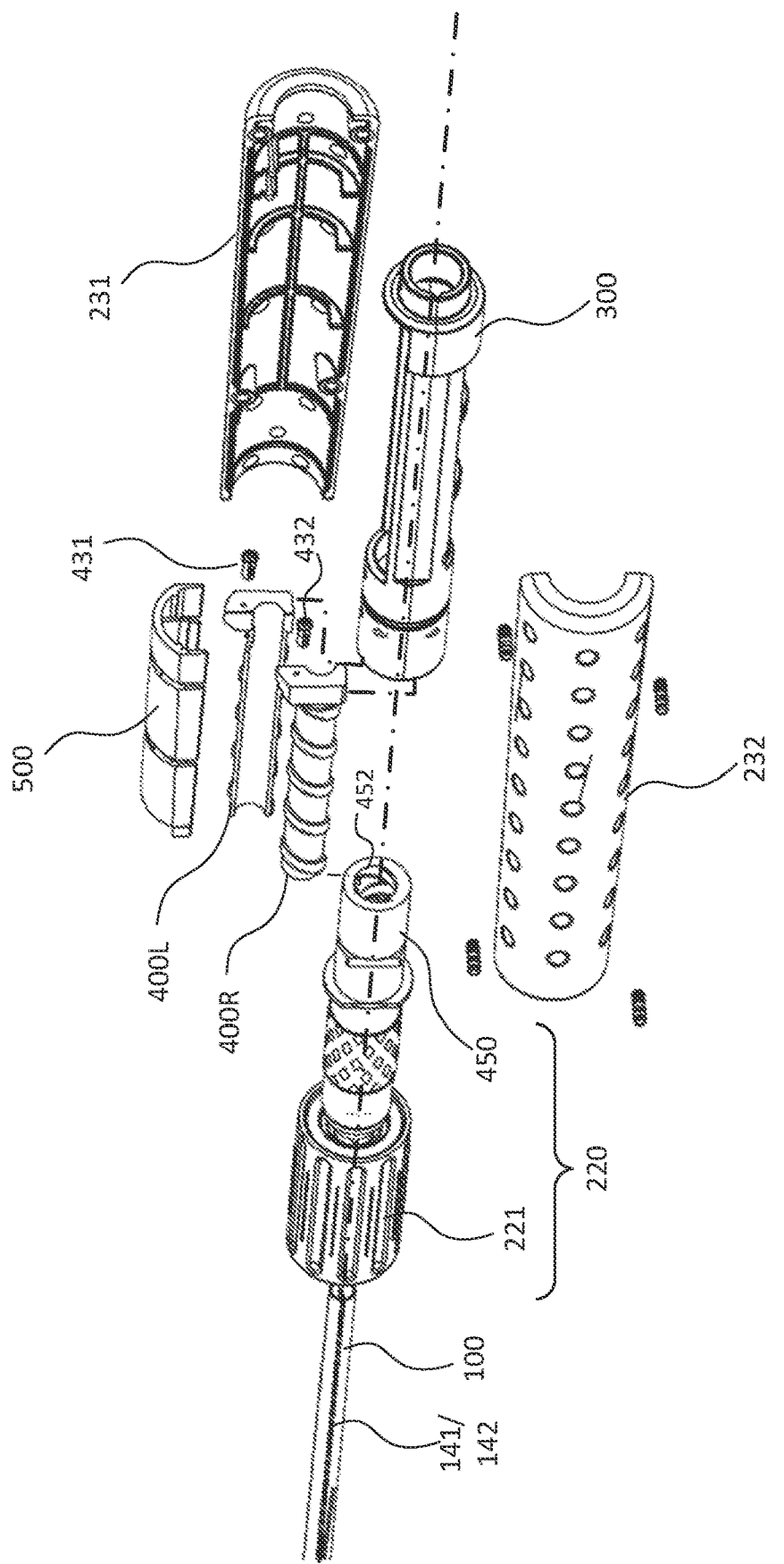
FIG. 2B is an exploded view illustration of the handle assembly of FIG. 1.
Figure 8:
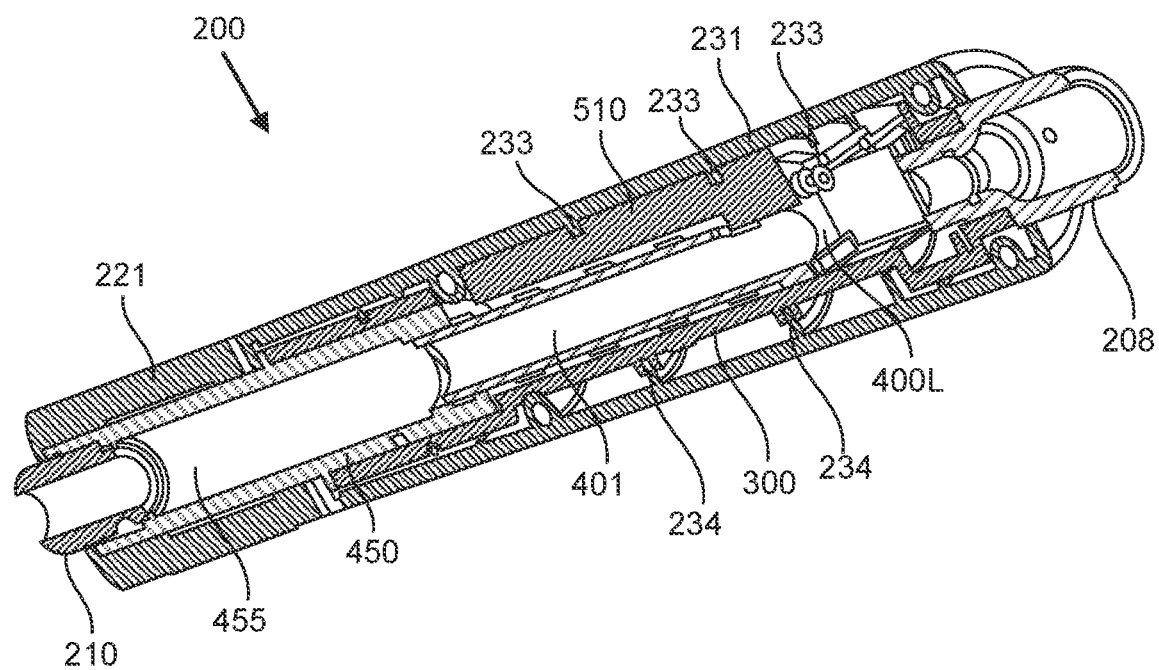
FIG. 8 is a cross-sectional view of the handle assembly of FIG. 1 along a longitudinal axis of the handle assembly.

FIG. 2A shows a close-up view of the handle assembly 200. FIG. 2B shows an exploded view of the handle assembly 200. FIG. 8 shows a longitudinal cross-sectional view of the handle assembly 200 showing example assembly of components therein.

Referring to FIG. 2A, the handle assembly 200 includes a handle housing 230 and an actuation assembly 220 axially coupled to a handle housing 230. The actuation assembly 220 includes a rotatable knob 221. In some embodiments, the handle housing 230 includes a first housing portion 231 and a second housing portion 232 that is removably coupled to the first housing portion 231. The handle assembly 200 is coupled to the proximal end 104 of the introducer shaft 110. The handle assembly 200 includes a retaining nut 210 used to secure the introducer shaft 110 to the handle assembly 200. The introducer shaft 110 extends through the retaining nut 210 to an actuation hub 450 (shown in FIG. 2B). The handle assembly 200 can include a connector 208 at the proximal end of the handle assembly 200 instead of the connection hub 108. For example, in some embodiments the connector 208 is an electrical connector configured to be operatively coupled with a mating electrical connector coupled with a recording or monitoring device. The handle assembly 200 may include a channel 401/411 (see FIG. 8) through which an electrical wire tube (e.g., containing electrical wires exiting the introducer shaft 110) may extend to the connector 208.

Figure 4A:
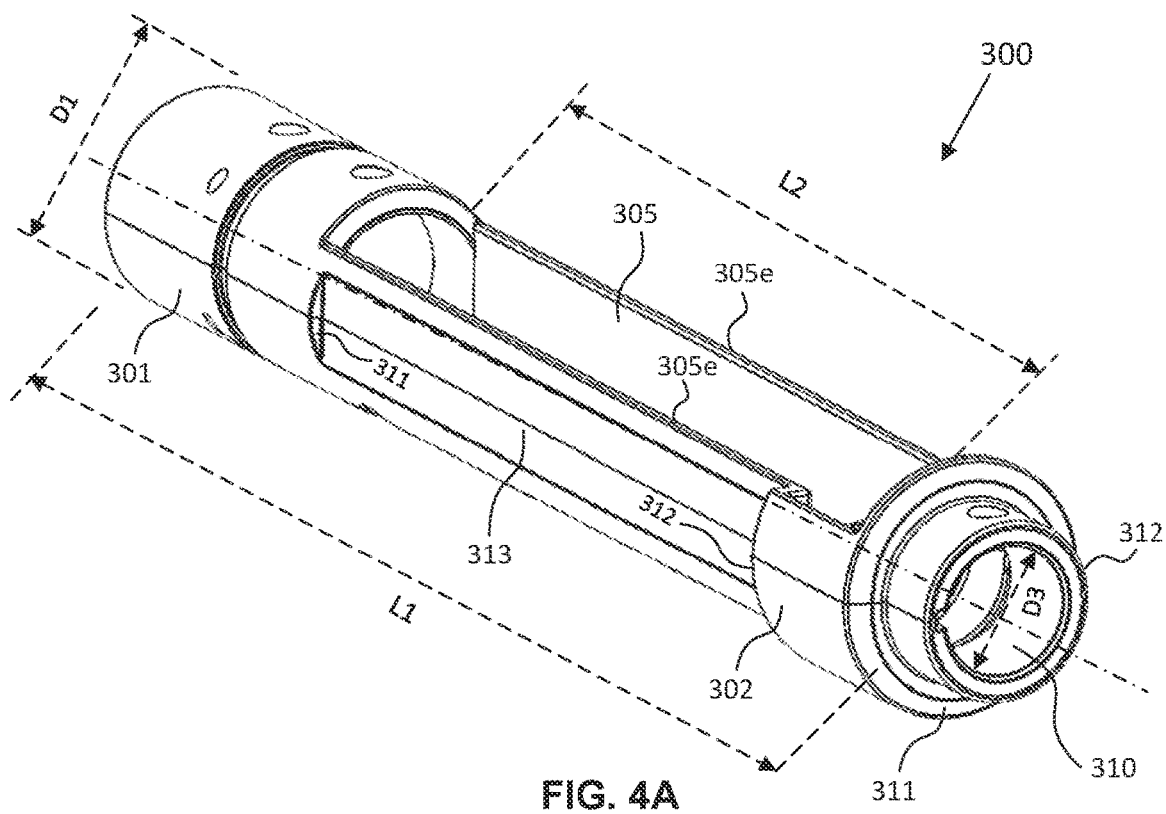
FIG. 4A and FIG. 4B illustrate a slide chassis of the handle assembly of FIG. 1.

Referring to FIG. 2B, the handle assembly 200 further includes a slide chassis 300 disposed within the handle housing 230 (e.g., within the first housing portion 231 and the second housing portion 232), a first slide member 400L drivingly coupled with the first deflection wire (e.g., 131), a second slide member 400R drivingly coupled with the second deflection wire (e.g., 132), and a slide block divider 500. The slide block divider 500 is disposed within the handle housing 230 (e.g., within the first housing portion 231 and the second housing portion 232). The slide block divider 500 and the slide chassis 300 combine to form a slide compartment 700 (shown in FIG. 7C) in which each of the first slide member 400L and the second slide member 400R is slidably disposed. The slide block divider 500 is configured in part to prevent the first deflection wire (e.g., 131) and the second deflection wire (e.g., 132) from crossing each other within the handle housing 230. The slide block divider 500 and the slide chassis 300 are also configured to constrain each of the first slide member 400L and the second slide member 400R during translation within the slide compartment to inhibit motion of the first slide member 400L and the second slide member 400R transverse to a longitudinal direction of the slide compartment 700. As illustrated in FIG. 7C, the slide compartment 700 is formed between a lumen portion of the slide chassis 300 and the slide block divider 500. The lumen portion of the slide chassis 300 is a portion of a lumen 310 between a distal end 301 and a proximal end 302 of the slide chassis 300, as shown in FIG. 4A.

Referring back to FIGS. 2A-2B, the actuation assembly 220 is drivingly coupled with each of the first slide member 400L and the second slide member 400R. The actuation assembly 220, when rotated in a first direction, simultaneously drives the first slide member 400L distally and the second slide member 400R proximally within the slide compartment 700. The actuation assembly 220, when rotated in a second direction opposite to the first direction, simultaneously drives the first slide member 400L proximally and the second slide member 400R distally within the slide compartment 700.

The rotatable knob 221 is coupled with the actuation hub 450. The actuation hub 450 includes internal threads 452 configured to engage the external right-handed thread and the external left-handed thread of the slide members (e.g., threads 412 and 422 in FIG. 5A). For example, the first slide member 400L may include an external right-handed thread (e.g., 412 in FIG. 5A), and the second slide member 400R may include an external left-handed thread (e.g., 422 in FIG. 5A). Accordingly, upon rotating the rotatable knob 221, the internal threads 452 engaged with the external right-handed thread and the external left-handed thread to cause the slide members 400L and 400R to move in opposite direction along the longitudinal axis of the handle housing 230.

Figure 3:
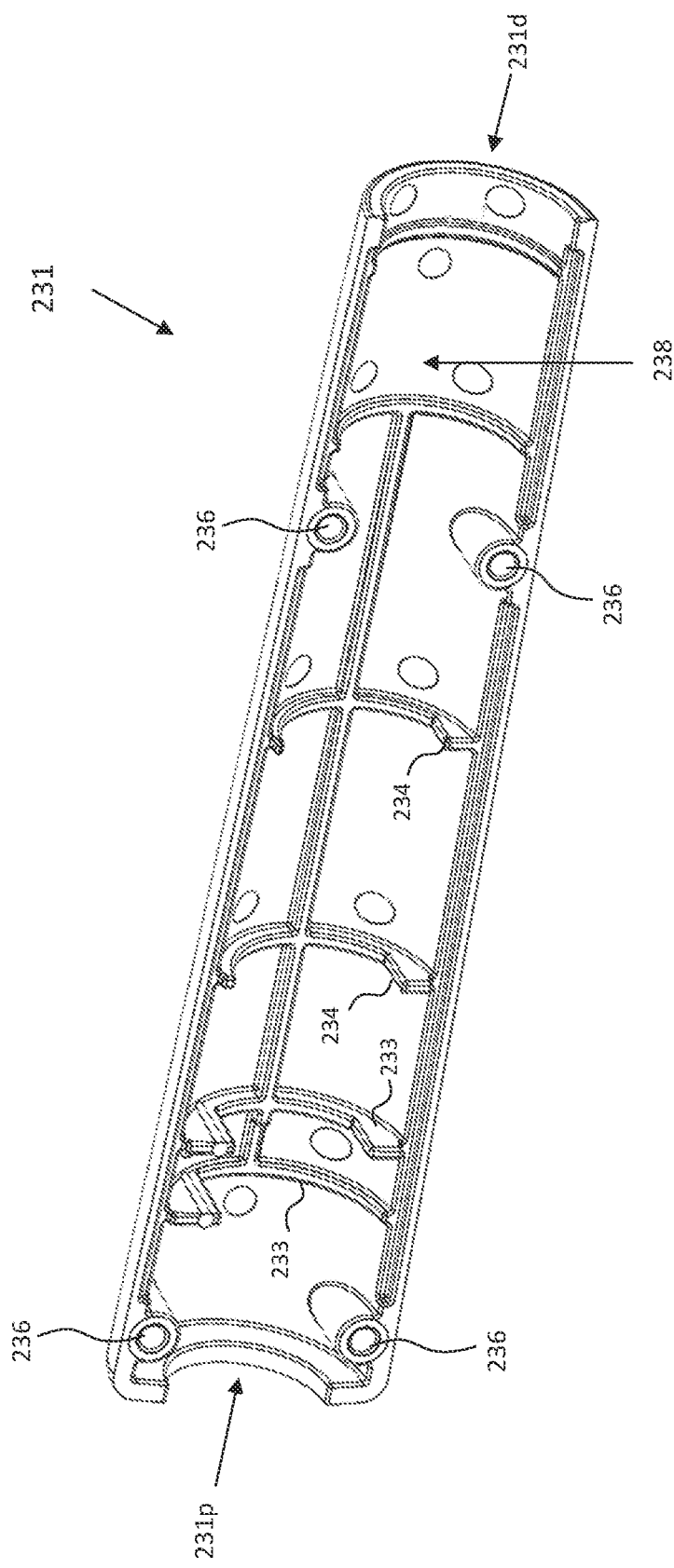
FIG. 3 illustrates a housing portion of the handle assembly of FIG. 1.

FIG. 3 shows example internal structure of the handle housing portion 231 of the handle housing 230. The first handle housing portion 231 and the second housing portion 232 may have the same internal structure, and/or include cooperating features to facilitate assembling of the handle housing portions 231 and 232. For example, an inner surface 238 of the handle housing 230 may have a curved shape with one or more ribs spaced from each other and extending along the curved shape. In some embodiments, the handle housing 230 may be substantially cylindrical in shape or a tapered cylindrical shape to provide ease of handling with one hand.

As shown in FIG. 3, the first handle housing portion 231 has a proximal end 231p and a distal end 231d. The outer diameter of the first handle housing portion 231 reduces from the proximal end 231p to the distal end 231d in a tapered manner. The inner surface 238 of the first handle housing portion 231 includes a plurality of ribs 233 spaced from each other and having partially circular shape. The ribs 233 form approximately ring or circular shape upon assembling the handle housing portions 231 and 232. The ribs 233 enhance structural integrity and restrict or prevent relative motion with other components (e.g., the slide block divider 500). One or more ribs 233 may include a radially projecting portion rib 234 to support another component (e.g., the slide chassis) and/or restrict or prevent relative motion with another component (e.g., the slide chassis 300). In some embodiments, the radially projecting rib portions 234 facilitate snug fitting of components within the handle housing 230. For example, the cross-section view in FIG. 8 illustrates the ribs 233 and the radially projecting rib portions 234 engaged with the slide block divider 500 and the slide chassis 300.

As shown in FIG. 8, a top surface of the slide block divider 500 is engaged with the ribs 233 on the inner surface of the first housing portion 231 to prevent relative motion between the handle housing 230 and the slide block divider 500. A bottom portion of the slide chassis 300 is engaged with the radially projecting rib portions 234 to support and prevent relative motion of the slide chassis 300 within the handle housing 230.

Referring back to FIG. 3, the first handle housing portion 231 may be coupled to the second handle housing portion 232 by known fastening means such as threaded screws, rivets, adhesive, or other means. Accordingly, the first handle housing portion 231 and the second handle housing portion 232 may include features for fastening. For example, the first handle housing portion 231 may include holes 236 that may be aligned with corresponding holes of the second handle housing portion 232 and a screw may be passed through the holes 236 to engage with the second handle housing portion 232.

Figure 4B:
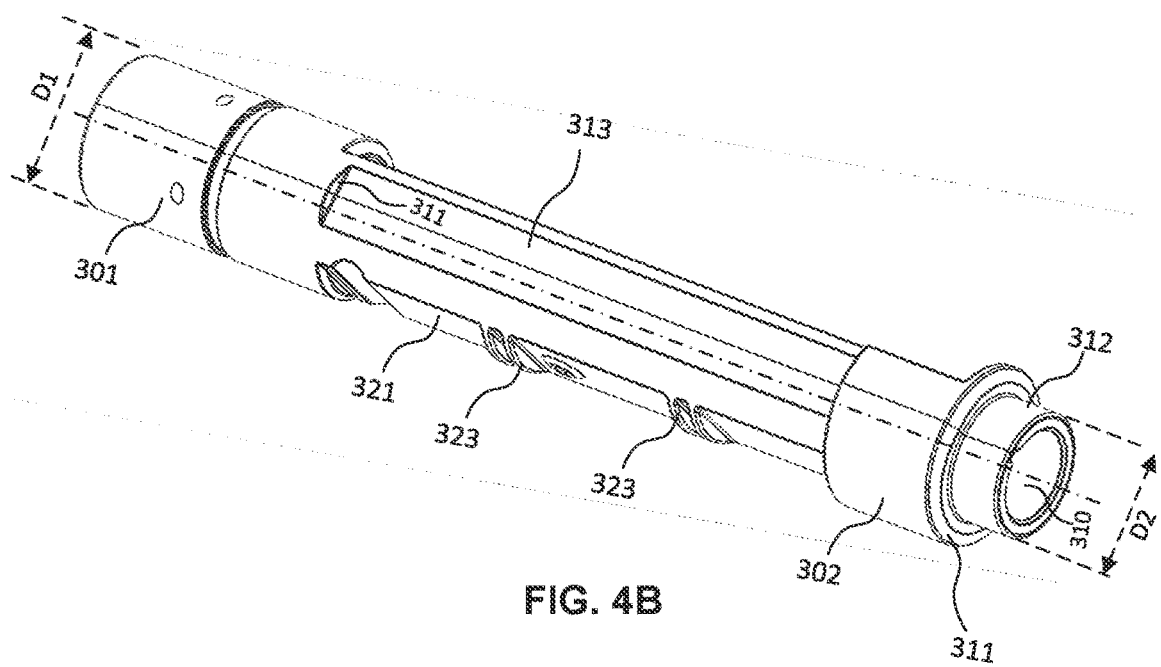

FIGS. 4A and 4B show top side, left side, and bottom side structural aspects of the slide chassis 300. FIG. 8 is a cross-sectional view of the handle assembly 200 along a longitudinal axis of the handle assembly 200. The slide chassis 300 includes a distal end 301 and a proximal end 302. The slide chassis 300 has a length L1 and a diameter D1 that are sized to fit within the handle housing 230. The slide chassis 300 has a substantially cylindrical shape with a first diameter for the length L1, and a smaller second diameter of a stepped portion 312 at the proximal end 302.

The slide chassis 300 includes external features that engage with internal features of the handle housing 230. For example, the slide chassis 300 includes external features that engage with an inner diameter of the handle housing 230, the ribs 233, and/or the radially projecting portions 234. FIG. 4B illustrates a bottom surface 321 of the slide chassis 300 configured to engage with features on the inner surface of the handle housing 230. For example, the bottom surface 321 includes flat portions with partially circular projecting portions 323 spaced to engage with one or more of the radially projecting portions 234 or ribs 233 (e.g., see FIG. 8). The bottom portions of the bottom surface 321 rest on top of the radially projecting portions 234. As shown in FIG. 8, lumens or hollow portions of the introducer, the handle housing, and the slide members are axial aligned with each other including components such as the retaining nut 210, the actuation hub 450, and the connector 208.

The slide chassis 300 has a stepped cylindrical configuration (e.g., a hollow cylindrical shape that includes stepped portions). The slide chassis 300 has a lumen portion 310 that accommodate the slide members 400L and 400R. The lumen 310 extends between the proximal end 302 and the distal end 301. The diameter of the lumen 310 varies along the length of the slide chassis 300. The diameter of the lumen 310 is sized to accommodate at least the introducer 100 of a desired diameter (e.g., an introducer up to 15 French) and the slide members 400L and 400R. A portion of the lumen 310 has a first inner diameter and another portion of the lumen 310 has second diameter D3 at the stepped portion 312 at the proximal end 302. The first inner diameter is larger than the second diameter D3. The first inner diameter is less than diameter D1 that extends from the proximal end 302 up to the distal end 301. The first inner diameter is the diameter D1 minus a thickness of the slide chassis 300. The first inner diameter is sized to receive a distal portion of the slide members 400L and 400R. The second diameter D3 is sized to receive a selected introducer. The proximal end 302 is configured in part to limit proximal translation of the slide members 400L and 400R within the slide chassis 300.

The slide chassis 300 includes a slide member opening 305 extending along a length of the slide chassis 300. The slide member opening 305 is configured to receive and accommodate installation of the first slide member 400L and the second slide member 400R into the lumen 310 of the slide chassis 300. The slide member opening 305 is partially defined by support edges 305e. The support edges 305e are configured to support the slide block divider 500. The slide member opening 305 has a length L2 extending from the stepped portion 312 toward the distal end 301.

Figure 6A:
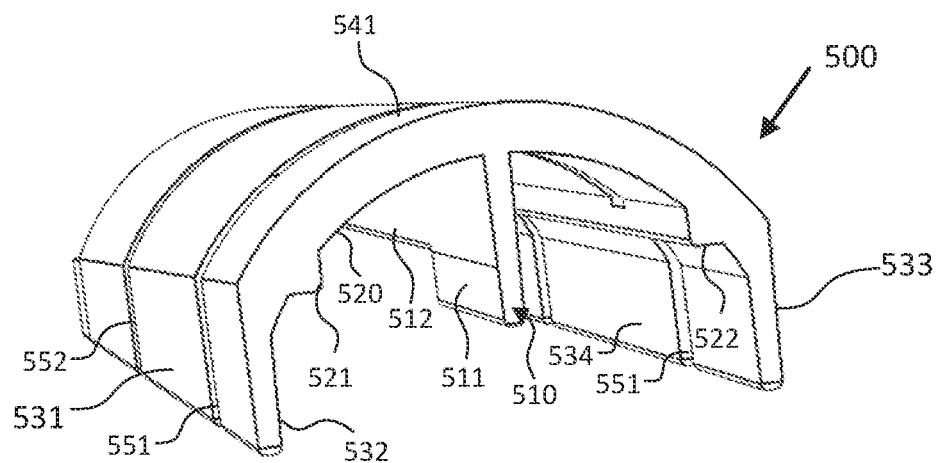
FIG. 6A, FIG. 6B, FIG. 6C, FIG. 6D, FIG. 6E, and FIG. 6F illustrate a slide block divider of the handle assembly of FIG. 1.
Figure 6B:
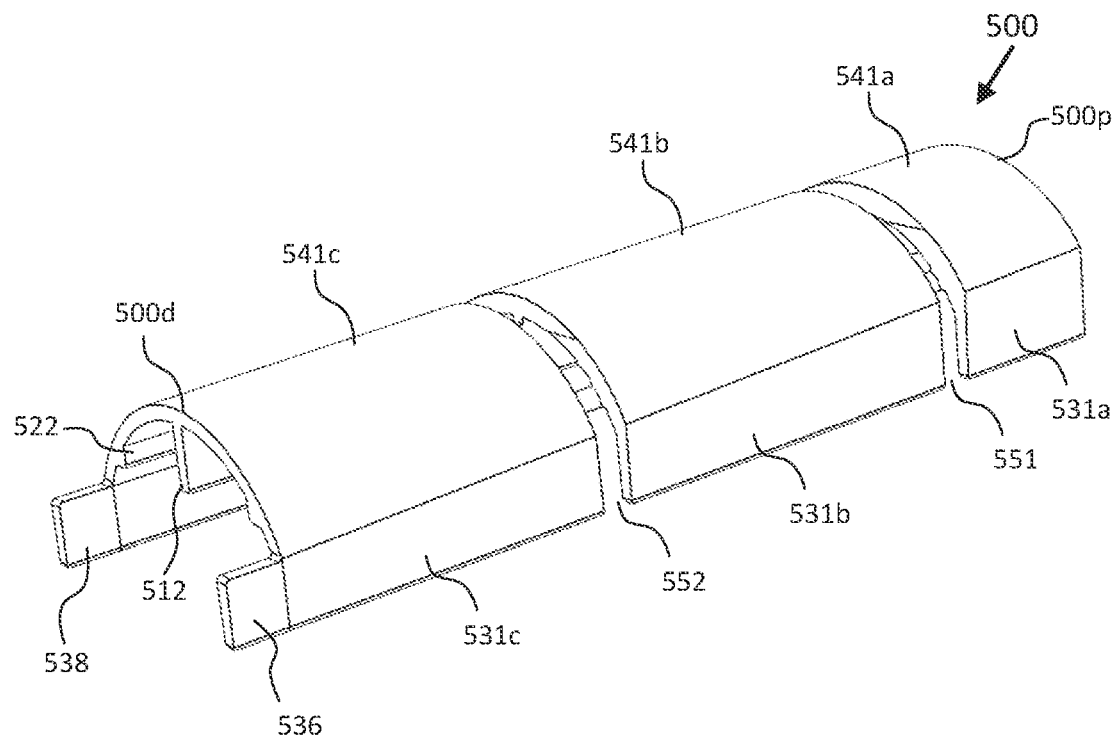
Figure 6C:
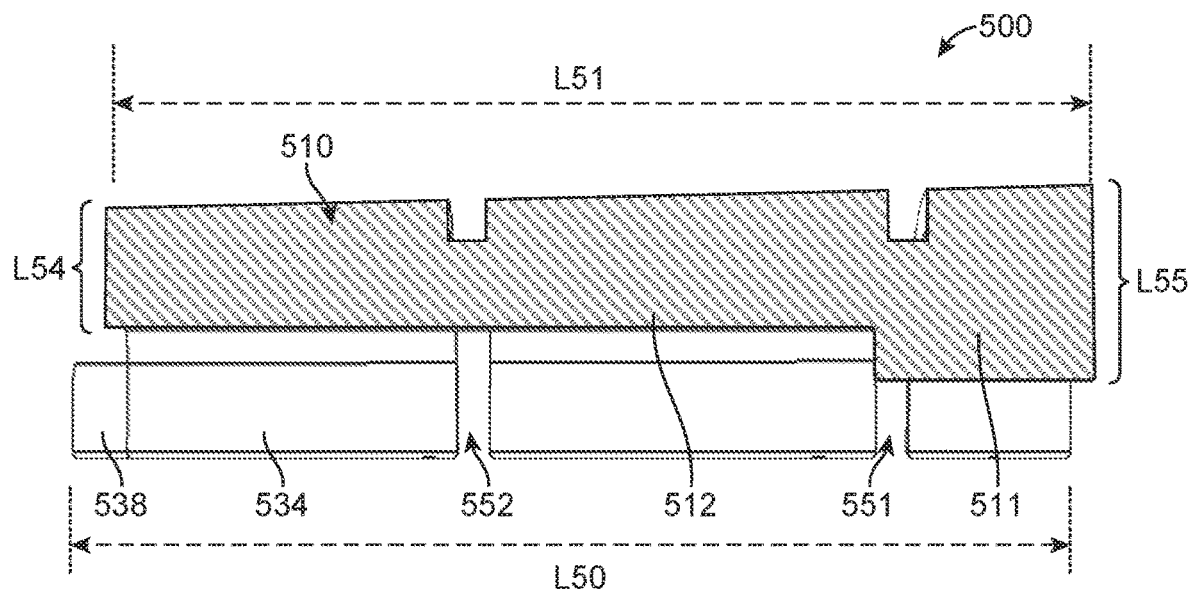
Figure 6D:
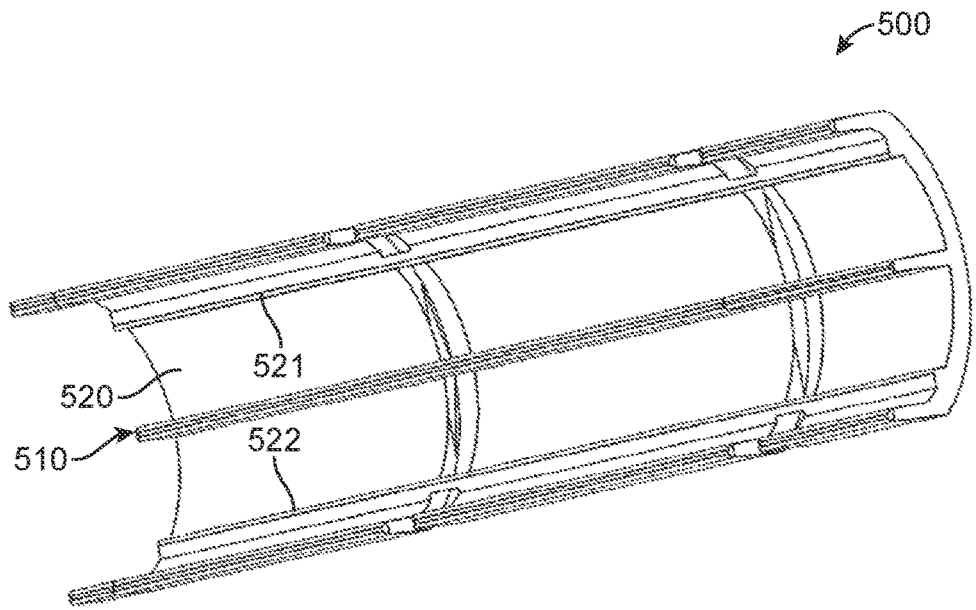
Figure 6E:
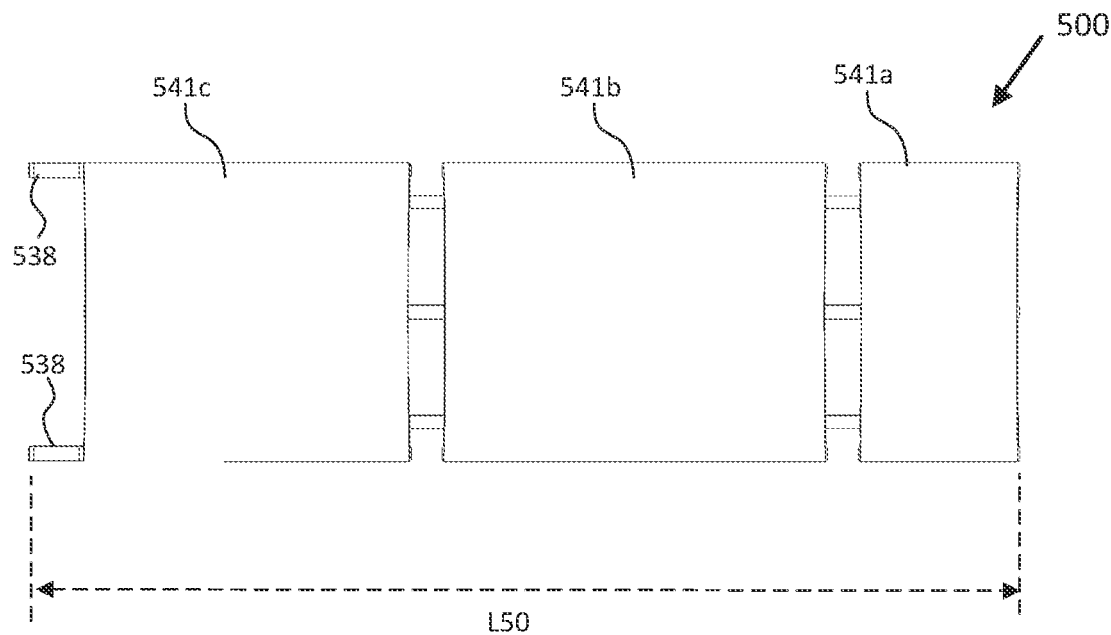
Figure 6F:
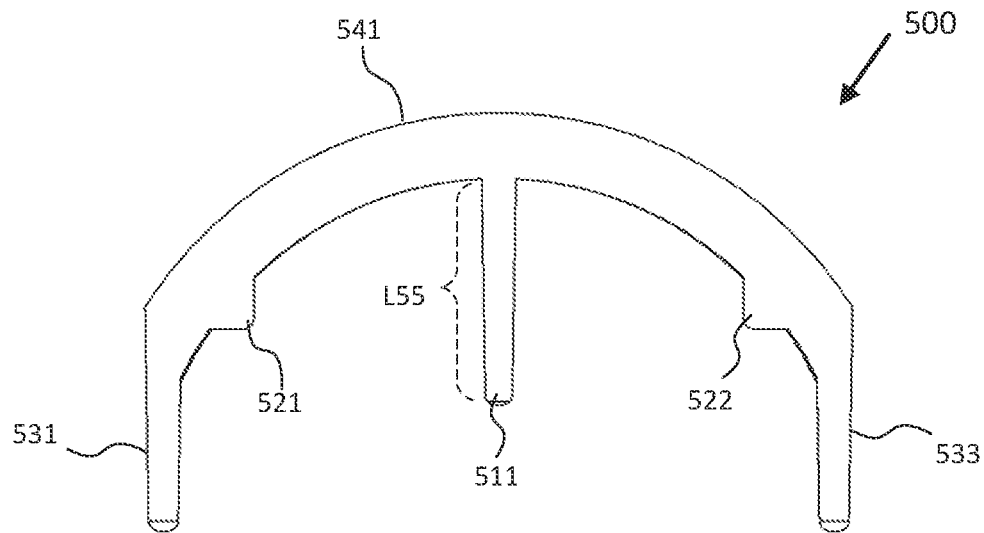

The slide chassis 300 includes a shoulder 311 for locating the slide block divider 500 within the handle assembly 200. The shoulder 311 forms a step along the stepped cylindrical body of the slide chassis 300. The shoulder 311 extends in a plane perpendicular to the support edges 305e. The slide chassis 300 includes flat side portions 313 that extend partially along a length L1 of the slide chassis 300. Inner surfaces of side walls (e.g., 531 and 533 in FIG. 6A)) of the slide block divider 500 contact the flat side portions 313. Although FIGS. 4A-4B show shoulder 311 and the flat side portion 313 on one side (e.g., a left side), the same shoulder 311 and the flat side portion 313 are included on the other side (e.g., a right side).

Figure 5A:
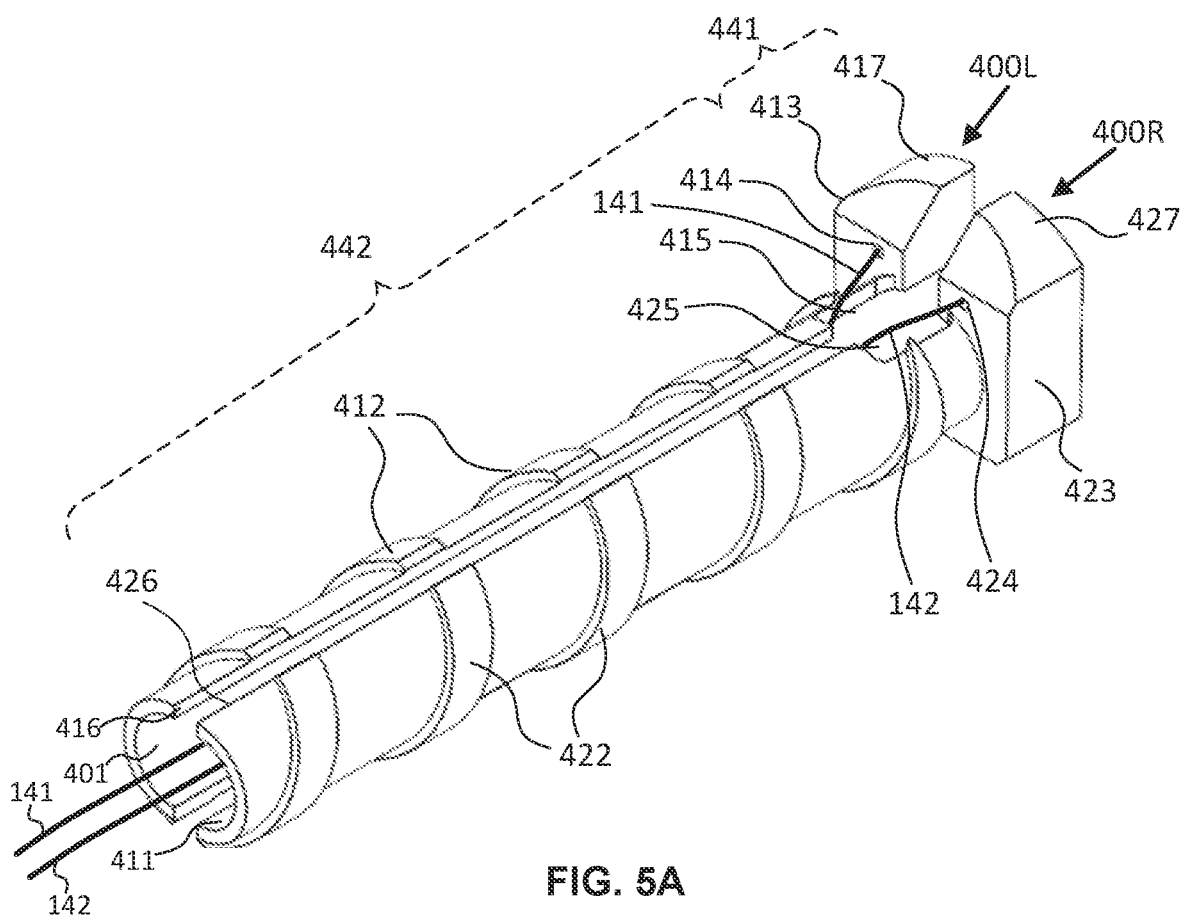
FIG. 5A and FIG. 5B illustrate slide members of the handle assembly and pull cables of the introducer of FIG. 1.
Figure 5B:
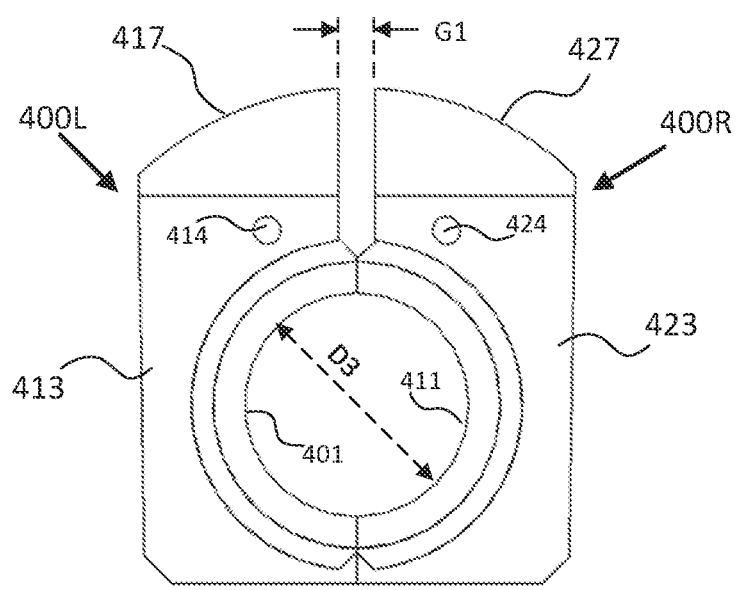

FIGS. 5A-5B show the slide members 400L and 400R. The slide members 400L and 400R may be mirror images of each other, each having a proximal portion 441 and a distal portion 442. The distal portion 442 of the first slide member 400L has an external right-handed thread 412. The distal portion 442 of the second slide member 400R has an external left-handed thread 422. The external right-handed thread 412 and the external left-handed thread 422 engage with the corresponding threads 452 of the actuation assembly 220 (see FIG. 2B) to cause the slide members 400L and 400R to slide axially in opposite directions when the rotatable knob 221 is rotated.

Each proximal portions 441 of the slide members 400L and 400R includes a block (e.g., a first block 413 and a second block 423) configured to anchor a deflection wire (e.g., 141 and 142). The blocks 413 and 423 are diametrically larger in size than a diameter of the distal portions 442. The blocks 413 and 423 include first curved surfaces 417 and 427 that engage corresponding inner curved surface of the handle housing 230. The blocks 413 and 423 have substantially rectangular shaped portions and include holes 414 and 424 to receive the deflection wires 141 and 142 from one side that can be coupled by retention screws 431 and 432 (see FIG. 2B) from other side of the blocks 413 and 423. The deflection wires 141 and 142 may only transmit tension forces. The deflection wires 141 and 142 may deflect or flex within an open area 415 and 425 (e.g., a cutout) formed in the distal portion 442 immediately adjacent to the proximal portion 441 of each slide members 400L and 400R when the slide member 400L or 400R displace distally.

The first slide member 400L includes a first channel 401 and the second slide member 400R includes a second channel 411. When the slide members 400L and 400R are assembled, as shown in FIG. 5B, the channels 401 and 411 combine to form the diameter D3 configured to receive the introducer 100 while allowing the slide members 400L and 400R to slide proximally and/or distally within the slide chassis 300. The deflection wires 141 and 142 extend through the channels 401 and 411. The deflection wires 141 and 142 extend from the extreme distal end of the introducer 100, through the introducer 100, and the channels 401 and 411 formed between the two slide members 400L and 400R, to a point near the proximal portion of the slide members. Each deflection wire may then be affixed to an individual slide 400L and 400R via the retention screw 431 and 432, respectively.

The slide members 400L and 400R include distal portion side surfaces (e.g., 416) configured to slide along either sides of a portion of the slide block divider 500 to inhibit rotation of the slide members within the slide compartment 700. The first slide member 400L includes a first slide member distal end side surface 416 configured to slide along first slide member side surfaces (e.g., a left side of a fin portion 512 shown in FIGS. 6A and 7D) of the slide block divider 500 to inhibit rotation of the first slide member 400L within the slide compartment 700. Similarly, the second slide member 400R includes second slide member distal end side surface 426 configured to slide along second slide member side surfaces (e.g., a right side of the fin portion 512 shown in FIGS. 6A and 7D) of the slide block divider 500 to inhibit rotation of the second slide member 400R within the slide compartment 700.

Figure 7A:
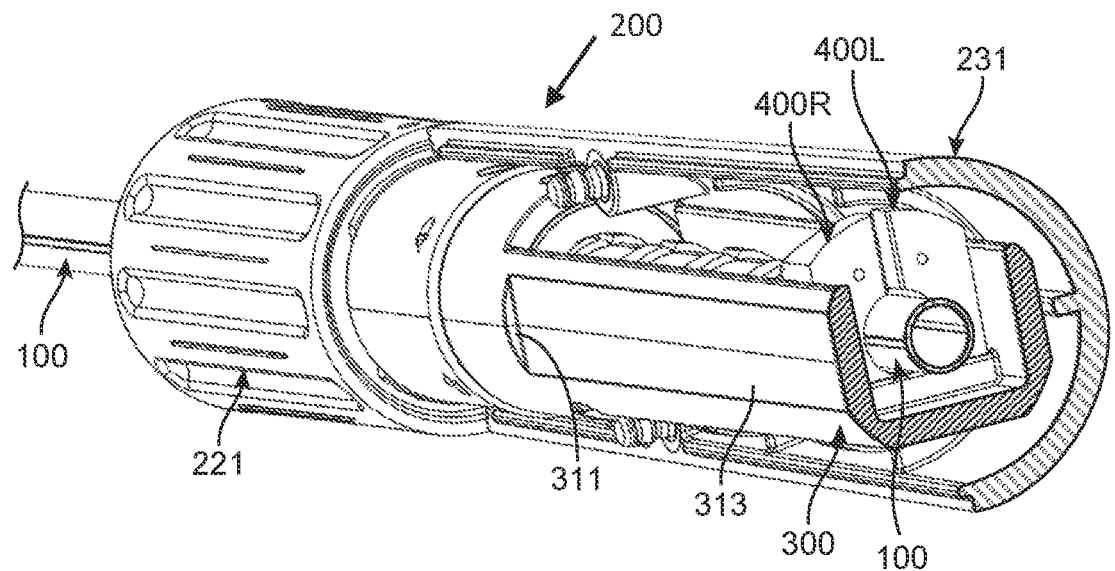
FIG. 7A illustrates the handle assembly of FIG. 1 without the slide block divider over slide members.
Figure 7B:
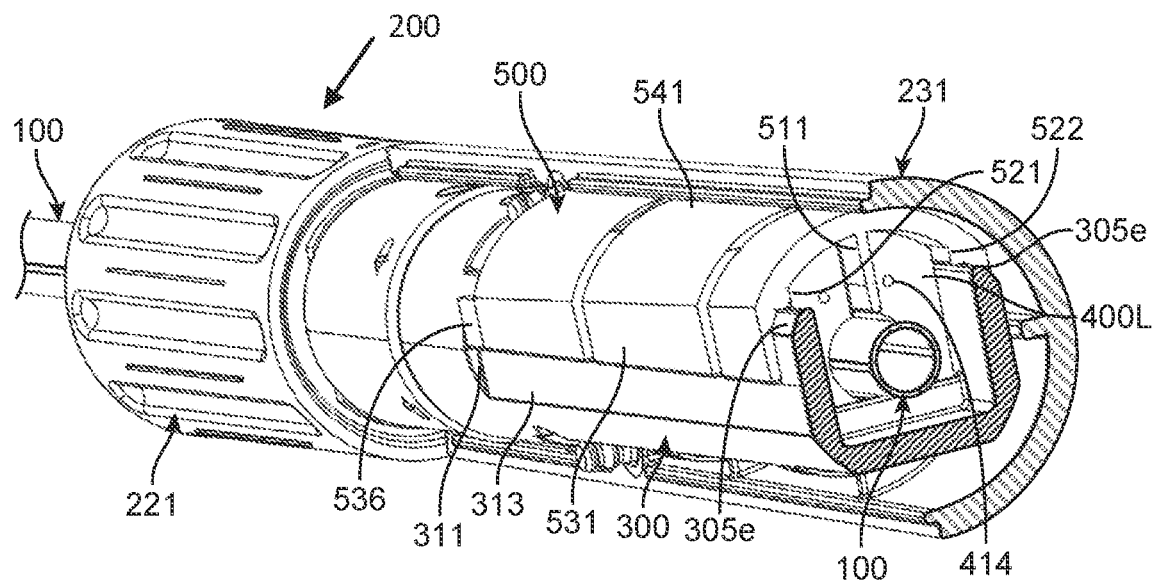
FIG. 7B illustrates the handle assembly of FIG. 1 with the slide block divider in place over the slide members.
Figure 7C:
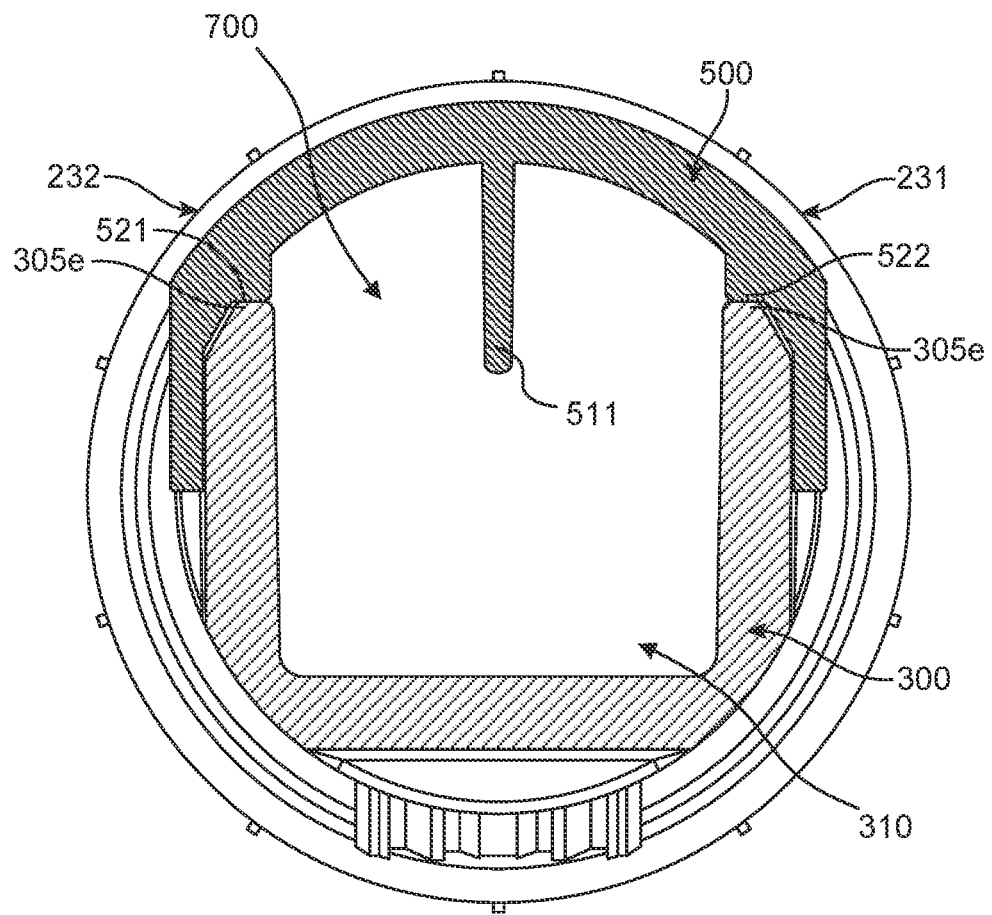
FIG. 7C is a front cross-sectional view of the handle assembly of FIG. 1 illustrating a slide compartment between slide chassis and the slide block divider.
Figure 7D:
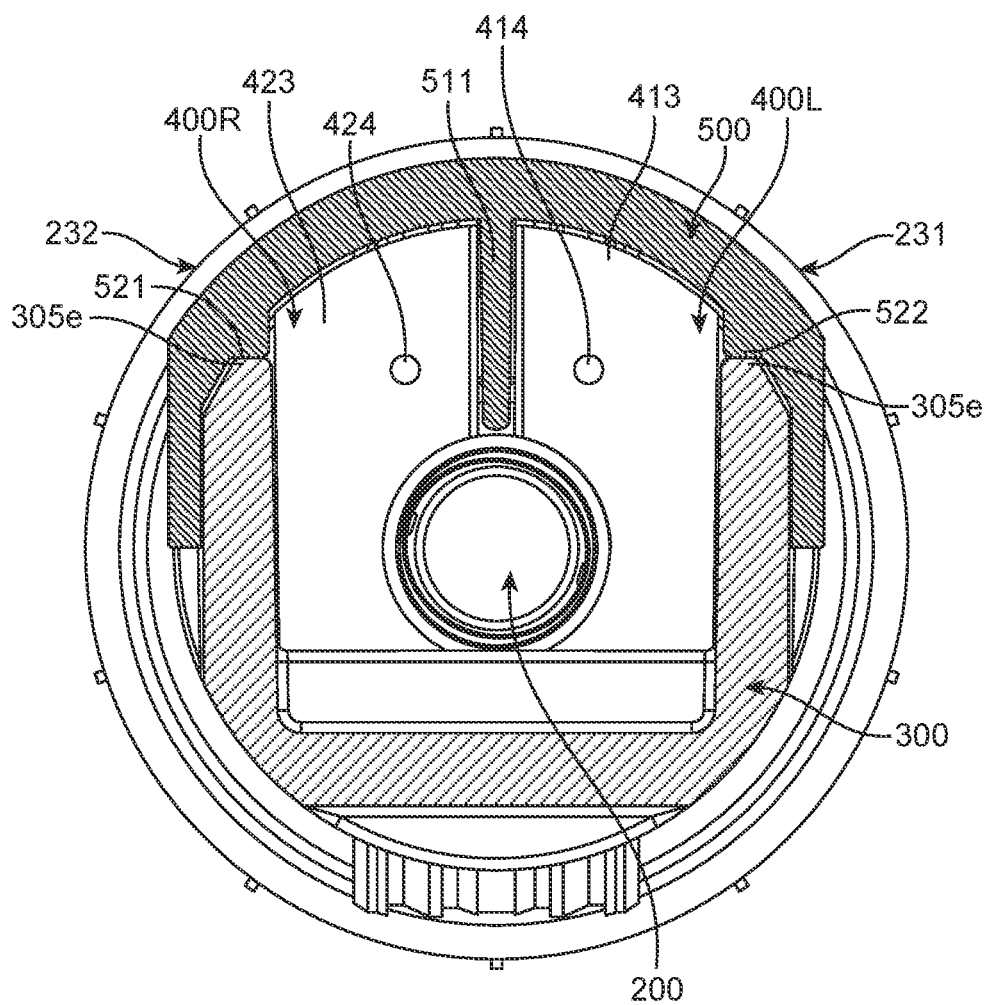
FIG. 7D is a front cross-sectional view of the handle assembly of FIG. 1 showing the slide members assembled in the slide compartment of FIG. 7C.

Referring to FIGS. 5B and 7D, the first slide member 400L and the second slide member 400R are separated by a gap G1 in which a portion of the slide block divider (e.g., 511) extends. The slide block divider 500 has an extended portion 511 at a proximal end of the slide block divider 500. The extended portion 511 is received in the gap G1 to prevent the first deflection wire 141 from crossing into the second deflection wire 142 during operation of the introducer 100. An example construction of the slide block divider 500 is further discussed with respect to FIGS. 6A-6F.

FIGS. 6A-6F illustrate different views of the slide block divider 500. The slide block divider 500 includes a proximal end 500p and a distal end 500d. The slide block divider 500 has a total length L50 (see FIG. 6C), which may be approximately equal to a length L2 of the opening 305 (in FIG. 4A) of the slide chassis 300. The slide block divider 500 may be made of plastic, metal or other material and may be removably coupled (e.g., snap fit) to the slide chassis 300 over the opening 305.

The slide block divider 500 includes a fin 510 on an inner surface 520 extending from a proximal end to a distal end of the slide block divider 500. The fin 510 is a radially projecting portion that extends from the proximal end to the distal end of the slide block divider and is disposed between the first slide member 400L and the second slide member 400R. The fin 510 prevents the slide members 400L and 400R from rotating and prevent the first deflection wire 141 from crossing with the second deflection wire 142 within the handle assembly 200.

The fin 510 of the slide block divider 500 includes a first extended portion 511 at the proximal end 500p (which has a radial length L55) and a second fin portion 512. The radial length L55 is less than a radial length L54 of the second fin portion 512. An axial length of the extended portion 511 may be approximately same as an axial length of the blocks 413 and 423 of the slide members 400L, 400R. The axial length of the first extended portion 511 may be less than the second fin portion 512. The axial length of the second fin portion 512 may be approximately same as an axial length of the distal portion 442 of the slide members 400L, 400R.

The slide block divider 500 includes an external surface 541 configured to interface with the inner surface 238 of the handle housing 230. The external surface 541 of the slide block divider 500 has a curved shape that is shaped complementary to the inner surface 238. The external surface 541 includes a first portion 541a, a second portion 541b, and a third portion 541c (see FIGS. 6B and 6E). Each portion 541a, 541b, and 541c of the external surface 541 is spaced from each other via slots 551, 552. The slide block divider 500 may be an integral component manufactured as a single piece (e.g., by a molding process) or may be manufactured by fixedly joining different pieced herein.

Each of the slots 551, 552 is configured to receive one of the ribs 233 of the handle housing 230. As shown in FIG. 8, the slots 551, 552 engage with the ribs 233 to prevent relative motion of the slide block divider 500 with respect to the handle housing 230.

The slide block divider 500 includes a pair of rails 521, 522. Each of the pair of rails 521, 522 extends along a length of the slide block divider 500 and is configured to rest on the slide chassis 300 (e.g., see FIG. 7D). The slide block divider 500 includes side walls 531, 533 that extend along a length of the slide block divider 500. Each of the pair of rails 521, 522 is formed on a respective one of the side walls 531, 533. The side walls 531 and 533 have inner side surfaces 532 and 534, respectively. Each of the side walls 531, 533 include a first side wall portion 531a extending from the first portion 541a, a second side wall portion 531b extending from the second portion 541b, and a third side wall portion 531c extending from the third portion 541c (see FIG. 6B).

The side walls 531, 533 of the slide block divider 500 includes a tail portion 536, 538 configured to butt against a shoulder (e.g., 311) of the slide chassis 300 and facilitate assembly of the slide block divider 500 and the slide chassis 300. When butted with the shoulder 311 of the slide chassis 300, the tail portion 536, 538 restricts or prevents motion of the slide block divider 500 relative to the handle housing 230.

FIG. 7A shows a cutaway view of the handle assembly 200 with the slide block divider 500 removed. The rotatable knob 221 is rotatably coupled with the slide chassis 300. The slide members 400L, 400R are disposed within the lumen portion 310 of the slide chassis 300. The rotatable knob 221 is drivingly coupled to the slide members 400L, 400R via the external threads of the slide members 400L, 400R and internal threads within the rotatable knob 221 as described herein. The introducer 100 extends partially through the channel formed by the channels 401, 411 (shown in FIGS. 5A-5B) of the slide members 400L, 400R.

As shown in FIGS. 7B, 7C and 7D, the slide block divider 500 is disposed over the slide chassis 300 forming the slide compartment 700 (in FIG. 7C). The inner surfaces of the side walls 531, 533 of the slide block divider 500 engage with the flat surfaces of the slide chassis 300. The rails 521, 522 rest on the support edges 305e. The extended portion 511 of the fin 510 is disposed between the slide members 400L, 400R.

When the slide members 400L and 400R move axially, the extended portion 511 of the fin 510 prevents the deflection wires 141, 142 from crossing each other. The movement of the slide members 400L, 400R articulates the deflection wires 141, 142, thereby causing the introducer 100 to deflect at the distal end 102 (in FIG. 1). The slide block divider 500 constrains the slide members 400L, 400R to linear translation within the slide chassis 300. The curved inner surface of the slide block divider 500 constrains the blocks 413, 423 from raising radially (e.g., upward in FIG. 7D).

Figure 9:
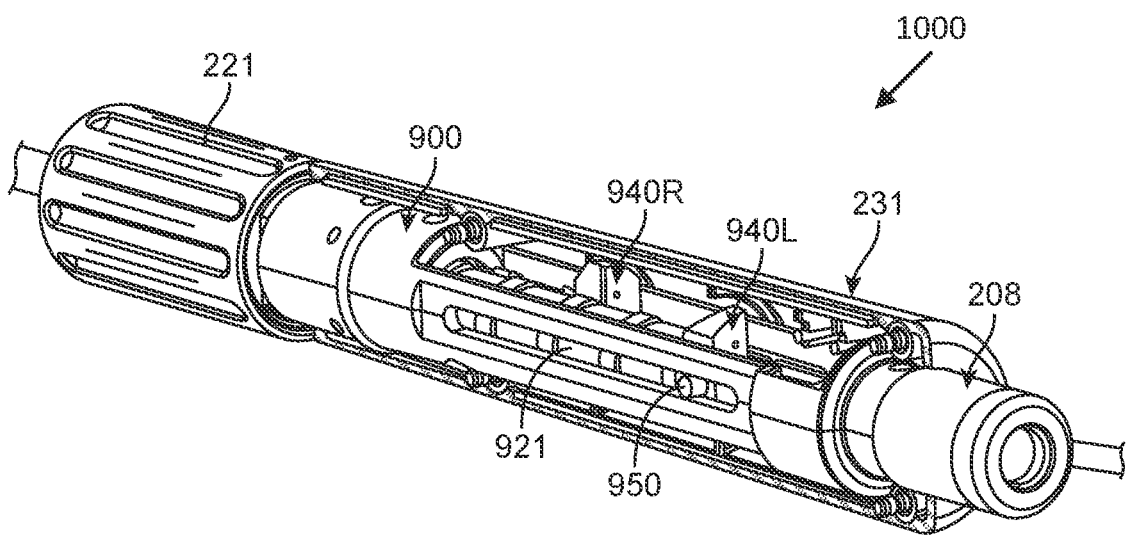
FIG. 9 is a partial view illustration of a handle assembly including a slotted slide and a pin.

FIG. 9 shows a cutaway view of a handle assembly 1000 that is configured similar to the handle assembly 200 except for as described herein. The handle assembly 1000 includes a slide chassis 900, slide members 940L, 940R, and pins 950 (one hidden from view in FIG. 9).

Figure 10A:
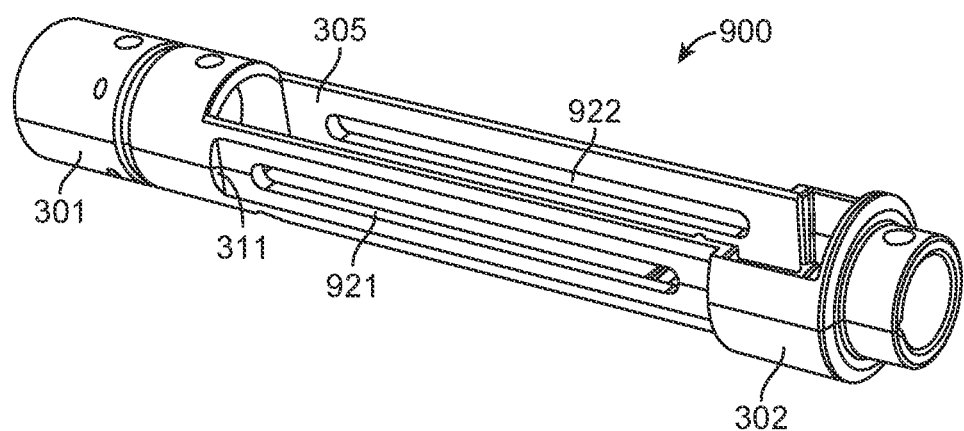
FIG. 10A illustrates another example of a slide chassis of the handle assembly of an introducer that includes a steerable section, according to some embodiments of the present disclosure.
Figure 10B:
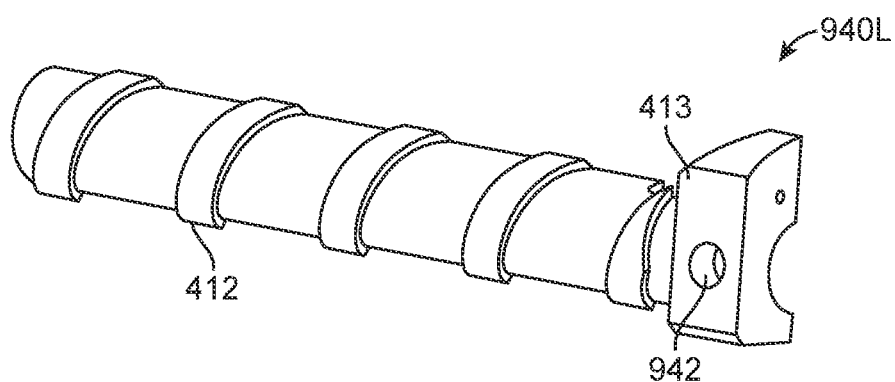
FIG. 10B and FIG. 10C illustrate slide members configured to be assembled with the slide chassis of FIG. 10A.
Figure 10C:
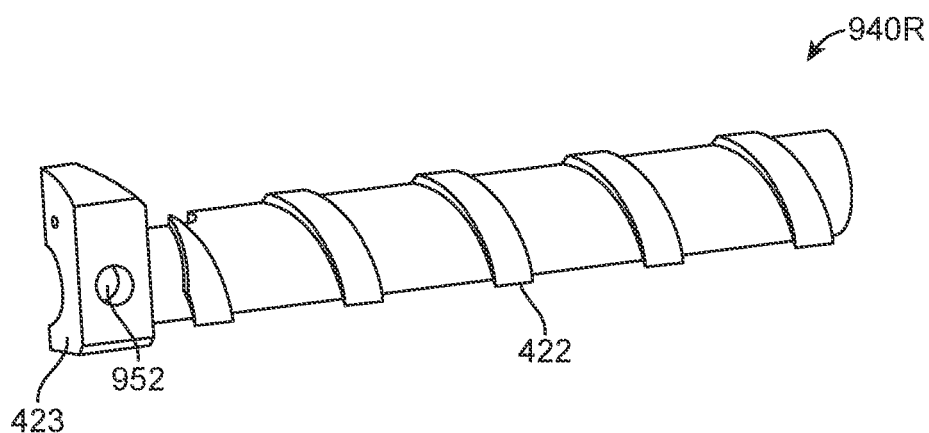
Figure 10D:
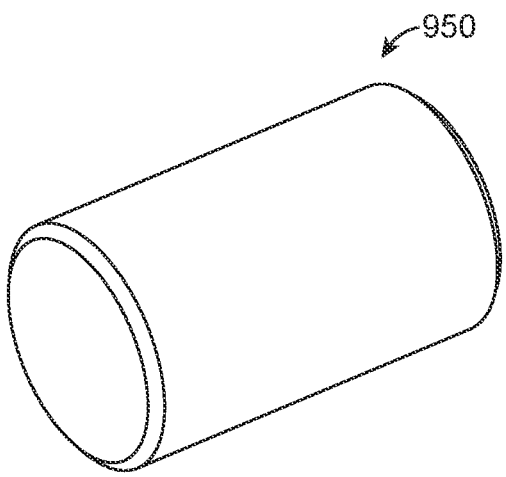
FIG. 10D illustrates a pin that is coupled to each of the slide members of FIG. 10B and FIG. 10C in a handle assembly of a introducer that includes a steerable section.

FIG. 10A shows the slide chassis 900. FIG. 10B shows the slide member 940L. FIG. 10C shows the slide member 940R. FIG. 10D shows one of the pins 950. In FIGS. 9-10D, components included in both the handle assembly 200 and the handle assembly 1000 are designated by the same reference numbers.

The slide chassis 900 of the handle assembly 1000 is configured similar to the slide chassis 300 of the handle assembly 200. The slide chassis 900 has a stepped cylindrical configuration with an opening 305 the same as the opening 305 of the slide chassis 300. The slide chassis 900 also includes a distal end 301 and the proximal end 302 with a stepped portion extending from the proximal end 302. In contrast to the slide chassis 300, the slide chassis 900 includes pin slots 921, 922 that extend at least partially along a length of the flat portions of the slide chassis 900. The length of the pin slots accommodates a suitable range of motion of the slide members 940L, 940R. Each of the pin slots 921, 922 is configured to receive one of the pins 950 and accommodate sliding of the pin 950 along the pin slot 921, 922.

The slide members 940L, 940R are configured similar to the slide members 400L, 400R of the handle assembly 200. For example, the slide member 940L includes the external thread 412 and the slide member 940R includes the external thread 422. The external threads 412, 422 are engaged with the internal threads of the rotation knob 221 to facilitate axial movement of the slide members 940L, 940R in opposite directions. Furthermore, the slide members 940L, 940R include proximal portions having the blocks 413, 423. The blocks 413, 423 include pin holes 942, 952, respectively, to receive one of the pins 950. Each of the two pins 950 extends into one of the pin holes 942, 952, which hold the pin 950 in a fixed position and orientation relative to the respective slide member 940L, 940R.

As shown in FIG. 9, the first slide member 900L is slidingly disposed within a lumen of the slide chassis 900 such that one of the pins 950 is slidably engaged within the pin slot 921. Similarly, the second slide member 900R is slidingly disposed within the lumen of the slide chassis 900 such that the second pin 950 (hidden from view in FIG. 9) is slidably engaged within the slot 922 (shown in FIG. 10A). The pins 950 and the slots 921, 922 constrain the slide members 900L, 900R transversely while allowing the slide members 900L, 900R to move longitudinally within the slide chassis 900. The pins 950 and the slots 921, 922 prevent the slide members 900L, 900R from moving radially (e.g., upward) or displacing sideways relative to the slide chassis 900. In some embodiments, the handle assembly 1000 further includes the slide block divider 500, which can be configured to be disposed over the slide chassis 900. In some embodiments, the handle assembly 1000 does not include the slide block divider 500.

Figure 11:
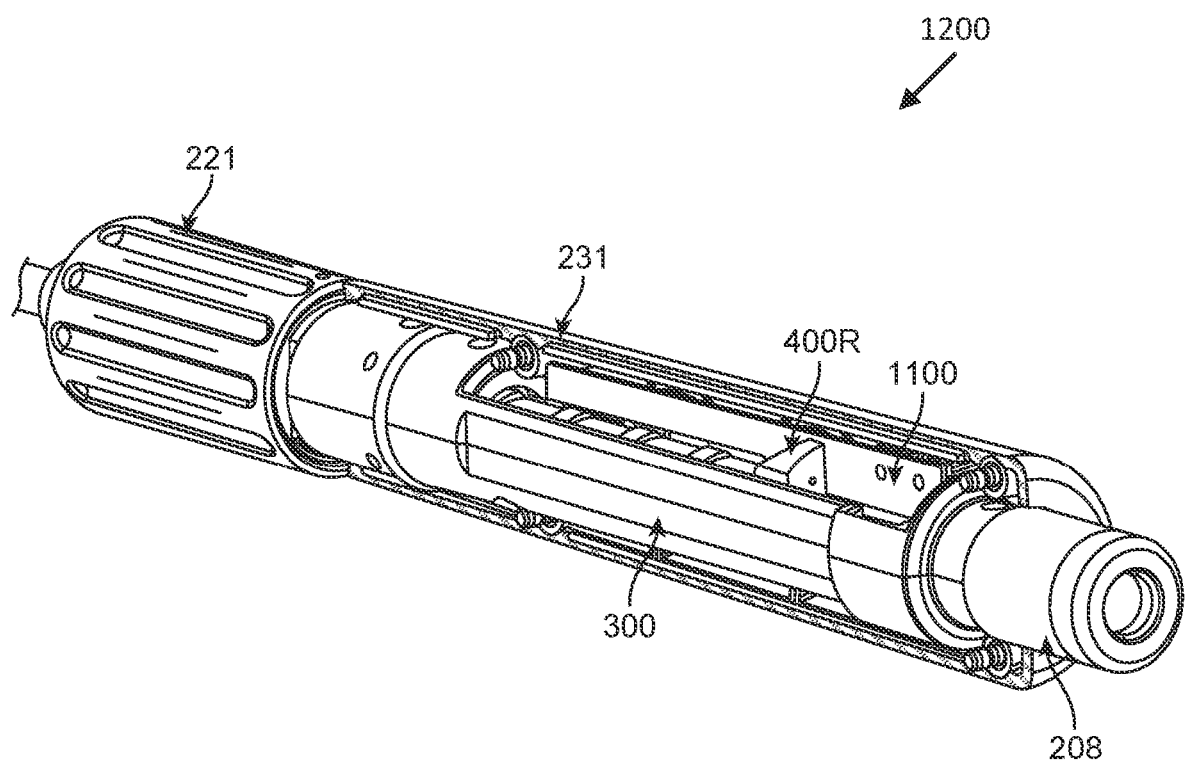
FIG. 11 illustrates another slide block divider of a handle assembly of an introducer that includes a steerable section, according to some embodiments of the present disclosure.
Figure 12:
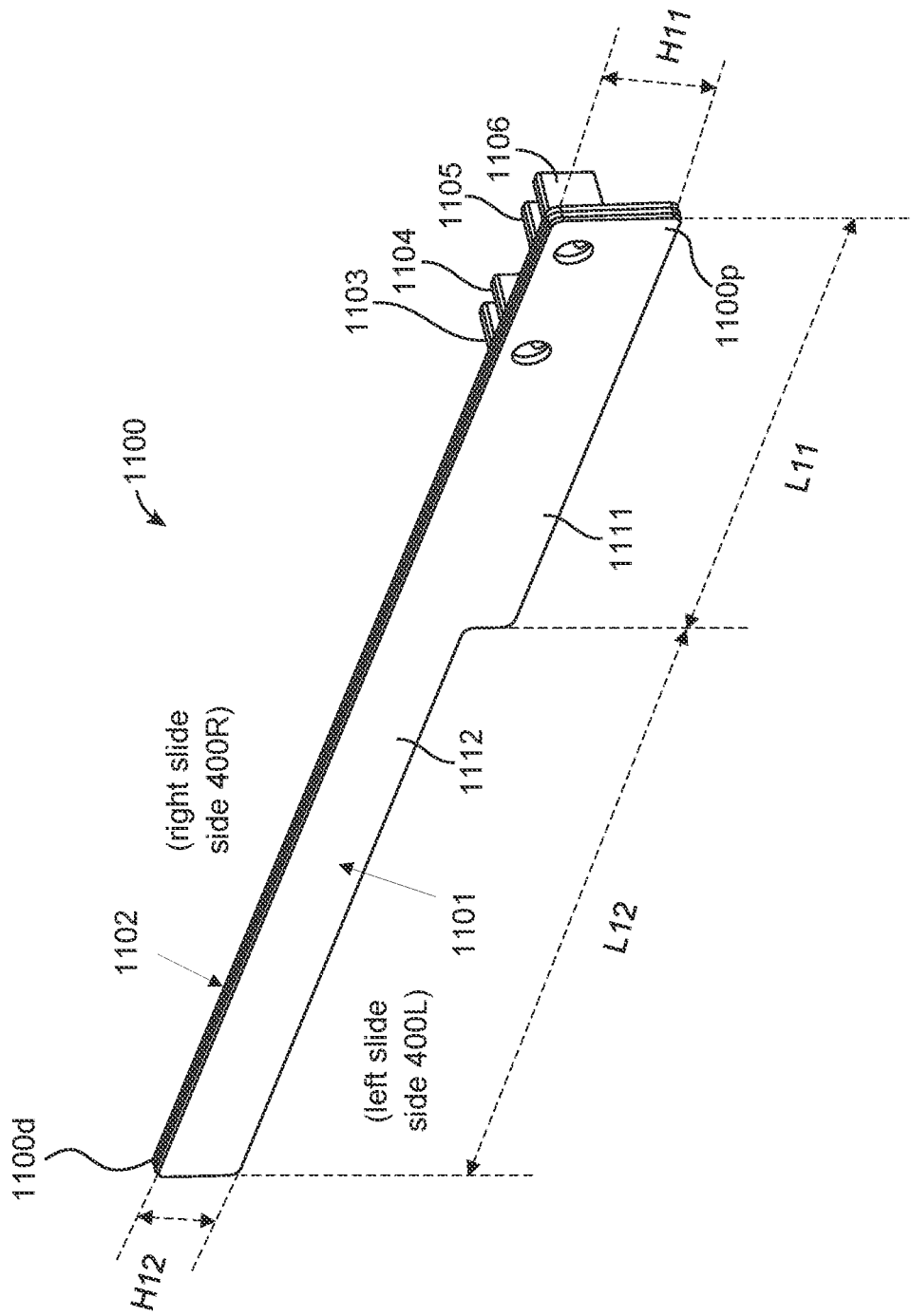
FIG. 12 is a partial view illustration of a handle assembly that includes the slide block divider of FIG. 11.

FIG. 11 shows a cutaway view of a handle assembly 1200 that is configured similar to the handle assemblies 200, 900 except for as described herein. The handle assembly 1200 includes the slide members 400L, 400R and a slide block divider 1100. As shown in FIG. 12, the slide block divider 1100 includes an elongated profiled plate having a distal end 1100d, a proximal end 1100p, a first face surface 1101 on one side, and a second face surface 1102 on other opposite side. The elongated profiled plate of the slide block divider 1100 is similar in shape and function to the fin 510 of the slide block divider 500 (e.g., see FIG. 6C). The slide block divider 1100 includes a first portion 1111 and a second portion 1112 that have shapes that are complementary to the external profiles of the slide members 400L, 400R. The first portion 1111 has a first length L11 corresponding to a length of the proximal portion 441 of the slide members 400L, 400R (see FIG. 5A) and a first height H11 corresponding to a distance between the inner surface 238 of the handle housing 230 to a top of the slide members 400L, 400R. The second portion 1112 has a second length L12 corresponding to a length of the distal portion 442 of the slide members 400L, 400R (see FIG. 5A) and a second height H12 corresponding to a depth of the gap (e.g., G1 in FIG. 5B) between the slide members 400L, 400R.

In the illustrated embodiment, the second face surface 1102 includes lateral projections 1103, 1104, 1105, 1106 that protrude perpendicular to and from the second face surface 1102. The lateral projections 1103, 1104, 1105, 1106, however, may be provided at the first portion 1111 and protrude perpendicular to and from the first face surface 1101. The lateral projections 1103, 1104, 1105, 1106 may be sized and spaced corresponding to the ribs 233 of the handle housing 230 (in FIG. 3) and may be engaged with the ribs 233 to prevent relative motion between the slide block divider 1100 and the handle housing 230.

The slide block divider 1100 is disposed between portions of the slide members 400L, 400R. The second portion 1112 is located between the distal portions 442 of the slide members 400L, 400R. The second portion 1112 constrains the slide members 400L, 400R (e.g., in upward or sideways direction relative to the slide chassis 300) while allowing axial motion of the slide members 400L, 400R within the slide chassis 300. The first slide member side surface of the slide member 400L slides along the first face surface 1101 and the second slide member side surfaces of the other slide member 400R slides along the second face surface 1102. The first portion 1111 extends between the gap (e.g., G1 in FIG. 5B) and prevents the deflection wires 141, 142 from crossing each other while the slide members 400L, 400R slide in opposite directions within the slide chassis 300.

Figure 13:
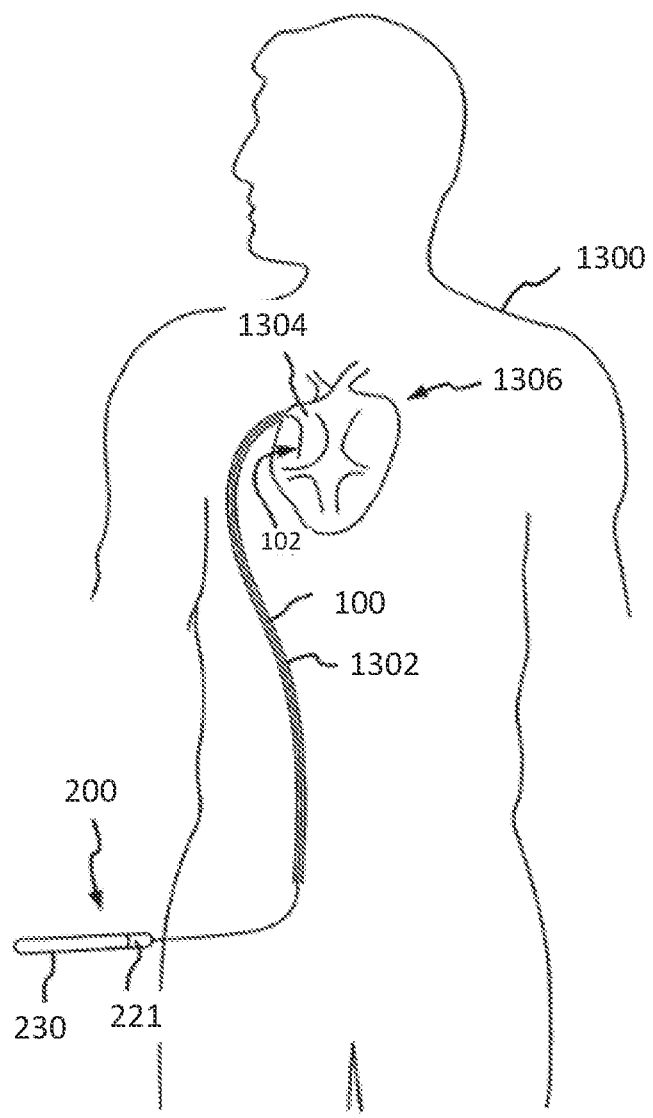
FIG. 13 is a diagrammatic illustration of the use of a catheter passed through an introducer that includes a steerable section and a handle assembly operable to articulate the steerable section in a procedure on a patient, according to some embodiments of the present disclosure.

FIG. 13 is a diagrammatic illustration of the introducer 100 employed in a procedure on a patient 1300. The distal end 102 of the introducer 100 is inserted into the patient 1300 (e.g., intravenously via a body lumen 1302 of the patient 1300, percutaneously, or via other avenues for entering the patient's body). The distal end 102 of the introducer 100 is advanced until positioned in a selected location within the patient 1300 (e.g., within a chamber 1304 of the patient's heart 1306 or other organ, with a body cavity of the patient, etc.). The distal end of the introducer 100 is then deflected by rotating the adjustment knob 221 about a longitudinal axis of the handle housing 230. As can be understood from FIGS. 1-12, this causes the slide members 400L, 400R within the handle housing 230 to displace along the longitudinal axis in opposite directions. Since each of the slide members 400L, 400R is coupled to its respective deflection wire 141, 142 and each deflection wire 141, 142 runs through the introducer 100 and is coupled to the distal end 102, the distal end 102 of the introducer 100 is deflected.

The introducer 100 can be used in conjunction with any suitable catheter, such as a diagnostic catheter, an RF ablation catheter, an electroporation catheter, etc. Example electroporation systems and catheters for electroporation systems are discussed in a PCT publication no. WO 2018102376A1, the entire disclosure of which is incorporated herein by reference.

Figure 14:
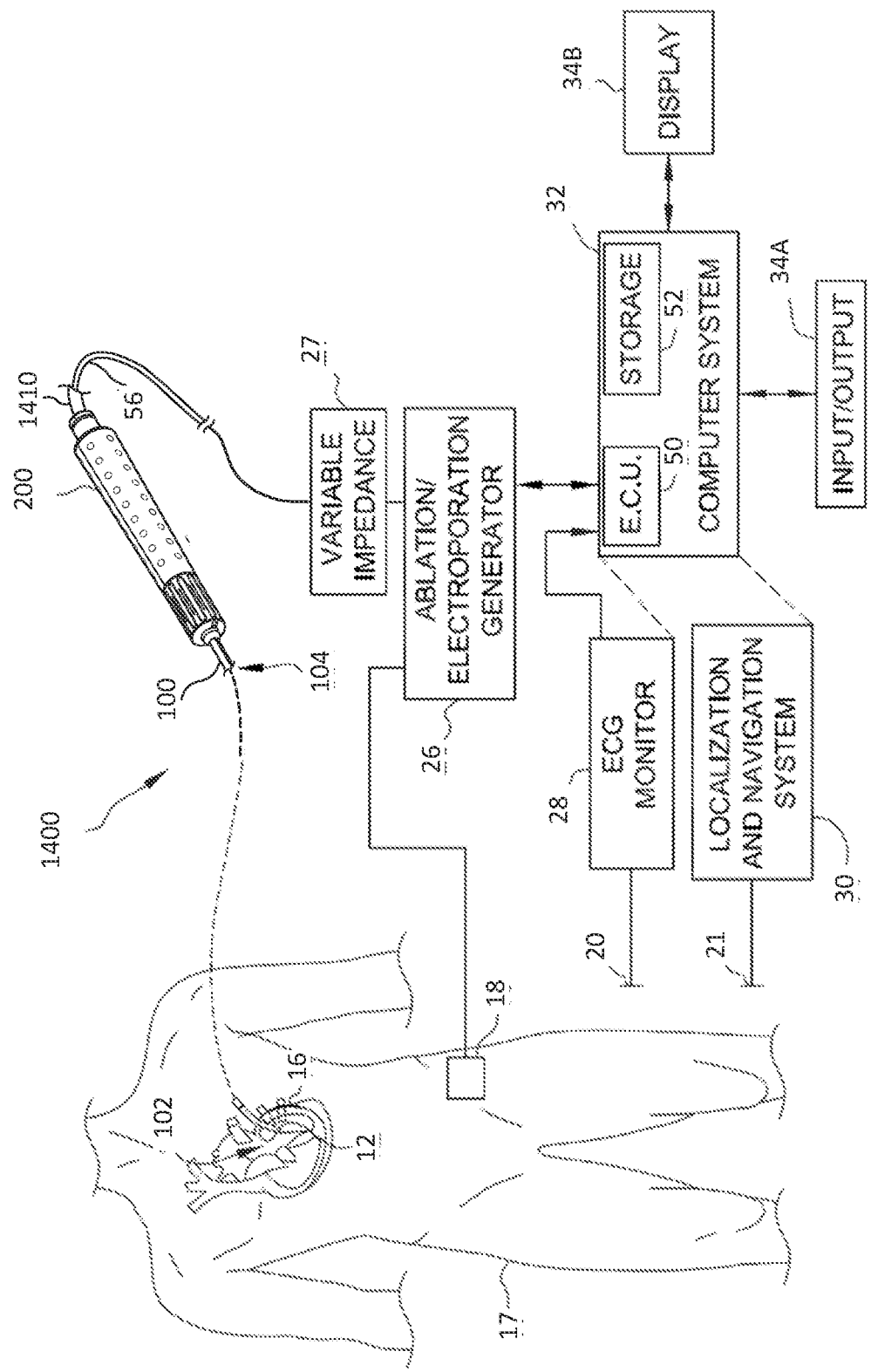
FIG. 14 is a schematic and block diagram view of a system for electroporation therapy, according to some embodiments of the present disclosure.

FIG. 14 is a diagrammatic and block diagram view of a system 1400 for electroporation therapy employing the handle assembly 200 of the introducer 100. The system 1400 may be used for irreversible electroporation to destroy tissue. In particular, the system 1400 may be used for electroporation-induced primary necrosis therapy, which refers to the effects of delivering electrical current in such manner as to directly cause an irreversible loss of plasma membrane (cell wall) integrity leading to its breakdown and cell necrosis. This mechanism of cell death may be viewed as an "outside-in" process, meaning that the disruption of the outside wall of the cell causes detrimental effects to the inside of the cell. Typically, for classical plasma membrane electroporation, electric current is delivered as a pulsed electric field (i.e., pulsed field ablation (PFA)) in the form of short-duration pulses (e.g., 0.1 to 20 ms duration) between closely spaced electrodes capable of delivering an electric field strength of about 0.1 to 1.0 kV/cm.

The handle assembly 200, 900, 1200 provides a location for the clinician to hold the introducer 100 and may further provide means for steering or the guiding introducer shaft 110 within body 17. For example, the handle assembly 200, 900, 1200 may include means to change the length of a guidewire extending through introducer 100 to the distal end 102. Moreover, in some embodiments, the handle assembly 200, 900, 1200 may be configured to vary the shape, size, and/or orientation of a portion of the introducer 100. The distal end 102 of the introducer 100 may be advanced until positioned in a selected location within the patient body 17. The distal end 102 of the introducer shaft 110 is then deflected by rotating the adjustment knob 221 about a longitudinal axis of the handle assembly 200, 900, 1200. As can be understood from FIGS. 1-12, this causes the slide members 400L, 400R within the handle housing 230 to displace along the longitudinal axis in opposite directions. Since each of the slide members 400L, 400R is coupled to its respective deflection wire 141, 142 and each deflection wire 141, 142 runs through the introducer 100 and is coupled to the distal end 102, the distal end 102 of the introducer 100 is deflected.

The introducer 100 can be used to introduce a catheter 1410 (e.g., a PFA catheter) into the heart (e.g., right or left atrium) to perform electroporation ablation to correct conditions such as cardiac arrhythmias. Once the introducer 100 is positioned at the selected location, the catheter 1410 may be introduced through the proximal end of the introducer 100. For example, the catheter 1410 may be inserted into a lumen of the introducer shaft 110 from the proximal end of the introducer 100 and slowly advanced through the lumen until a tip of the catheter 1410 extends beyond the distal end 102 of the introducer 100 and is positioned at the selected location. The catheter 1410 may include electrode(s) 12 used for a variety of diagnostic and therapeutic purposes including, for example and without limitation, cardiac mapping and/or ablation (e.g., electroporation ablation). For example, and in some embodiments, the electrode(s) may be configured as a bipolar electrode assembly for use in bipolar-based electroporation therapy. Specifically, the electrode(s) 12 can be individually electrically coupled to generator 26 (e.g., via suitable electrical cable 56 or other suitable electrical conductors extending through a proximal end of the catheter 1410) and are configured to be selectively energized (e.g., by an electroporation generator 26 and/or computer system 32) with opposite polarities to generate a potential and corresponding electric field therebetween, for electroporation therapy. That is, one of electrode(s) 12 is configured to function as a cathode, and the other is configured to function as an anode. Electrode(s) 12 may be any suitable electroporation electrodes. In the exemplary embodiment, electrode(s) 12 are ring electrodes. Electrode(s) 12 may have any other shape or configuration. It is realized that the shape, size, and/or configuration of electrode(s) 12 may impact various parameters of the applied electroporation therapy. For example, increasing the surface area of one or both electrode(s) 12 may reduce the applied voltage needed to cause the same level of tissue destruction. While the electrode(s) 12 is described as a bipolar electrode, it should be understood that in some embodiments, electrode(s) may be configured as a monopolar electrode and use a patch electrode (e.g., return electrode 18) as a return or indifferent electrode.

In some embodiments, a plurality of return electrodes 18, 20, and 21, which are diagrammatic of the body connections may be used by the various sub-systems included in the overall system 1400, such as the electroporation generator 26, an electrophysiology (EP) monitor such as an ECG monitor 28, or a localization and navigation system 30 for visualization, mapping and navigation of internal body structures. In the illustrated embodiment, return electrodes 18, 20, and 21 are patch electrodes. It should be understood that the illustration of a single patch electrode is diagrammatic only (for clarity) and that such sub-systems to which these patch electrodes are connected may, and typically will, include more than one patch (body surface) electrode. The system 1400 may further include a main computer system 32 (including an electronic control unit 50 and data storage-memory 52), which may be integrated with system 30 in certain embodiments. The computer system 32 may further include conventional interface components, such as various user input/output mechanisms 34a and a display 34b, among other components.

The electroporation generator 26 may be configured to energize the electrode element(s) in accordance with an electroporation energization strategy, which may be predetermined or may be user-selectable. A variable impedance 27 allows the impedance of the system to be varied to limit arcing from the electrode(s) 12 of the catheter 1410. Moreover, variable impedance 27 may be used to change one or more characteristics, such as amplitude, duration, pulse shape, and the like, of an output of electroporation generator 26. Although illustrated as a separate component, variable impedance 27 may be incorporated in the catheter 1410 or generator 26. In some embodiments, each variable impedance 27 may be connected to a different catheter electrode or group of catheter electrodes to allow the impedance through each catheter electrode or group of catheter electrodes to be separately varied.

Figure 15:
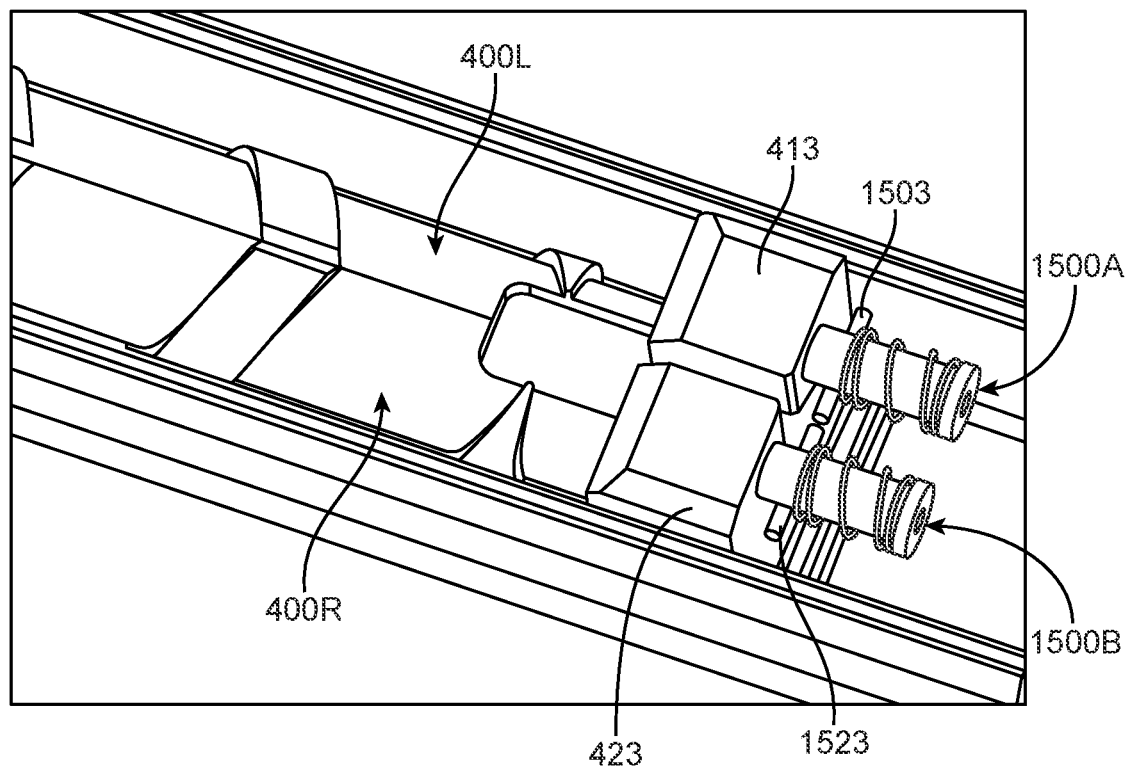
FIG. 15 illustrates a pin assembly coupled to slide members of the handle assembly of the introducer of FIG. 1.
Figure 16:
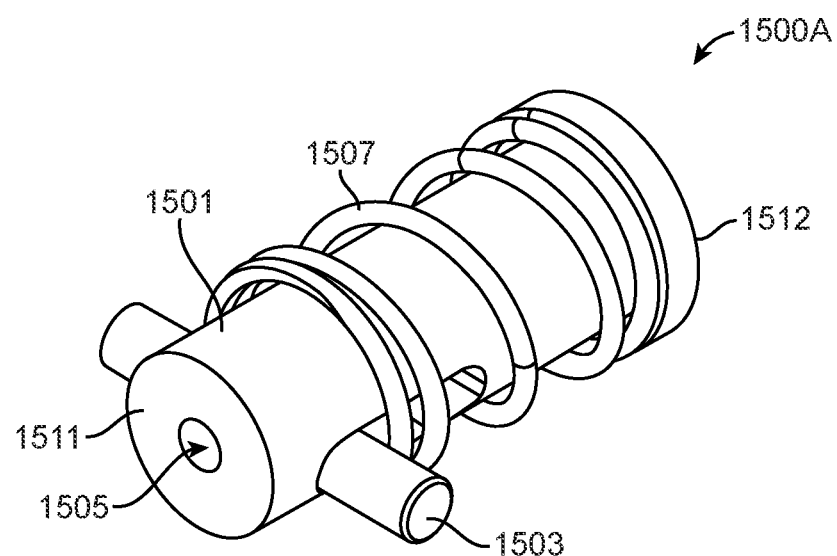
FIG. 16 is a perspective view of the pin assembly of FIG. 15.
Figure 17:
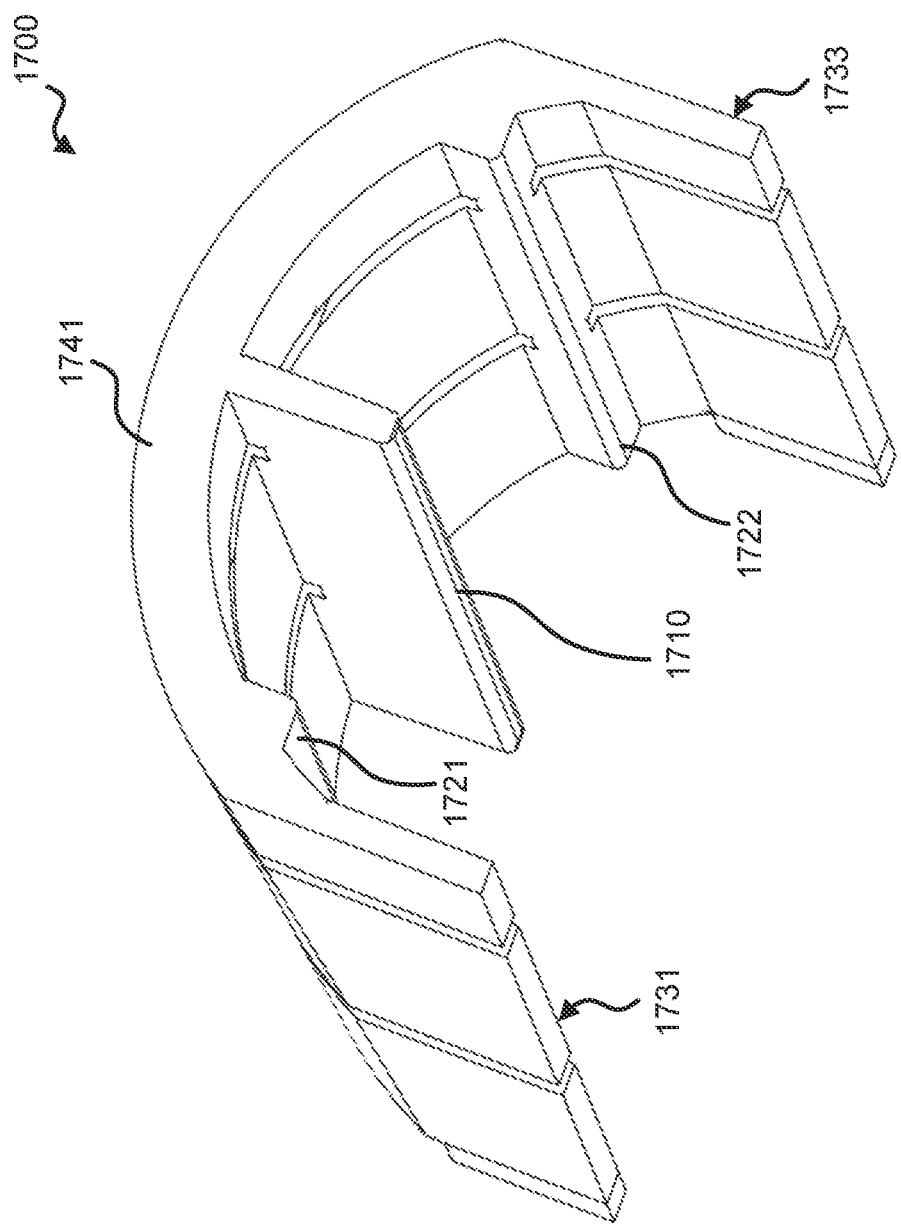
FIG. 17 is a bottom perspective view of another example of a slide block divider, according to some embodiments of the present disclosure.
Figure 18:
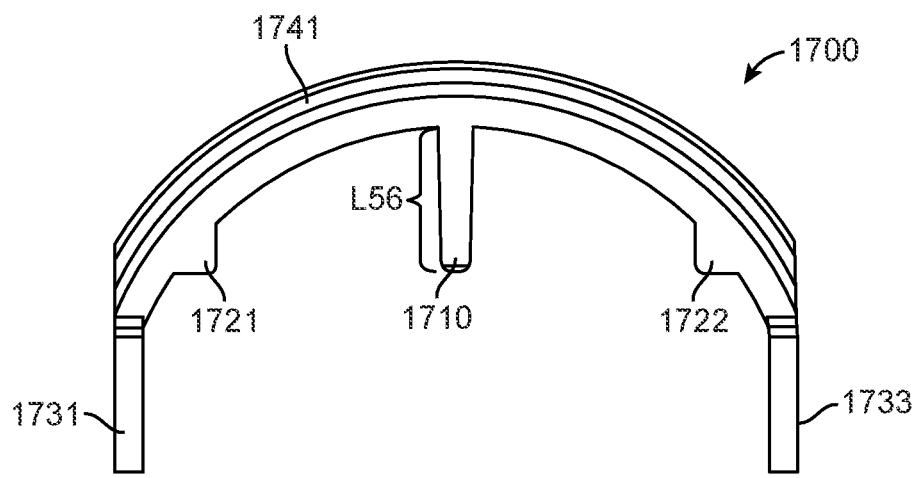
FIG. 18 is a front view of the slide block divider of FIG. 17.
Figure 19:
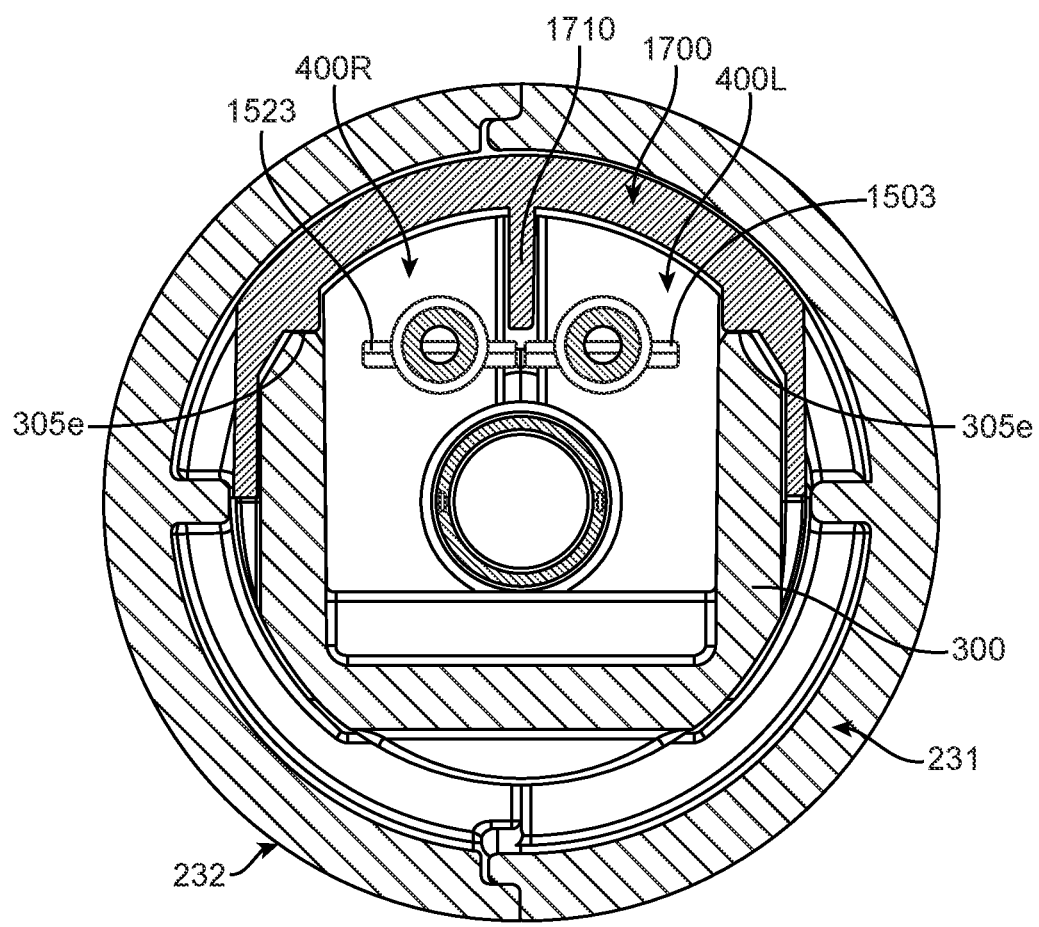
FIG. 19 is a front cross-sectional view of the handle assembly of FIG. 1 showing the slide block divider of FIG. 17.
Figure 20:
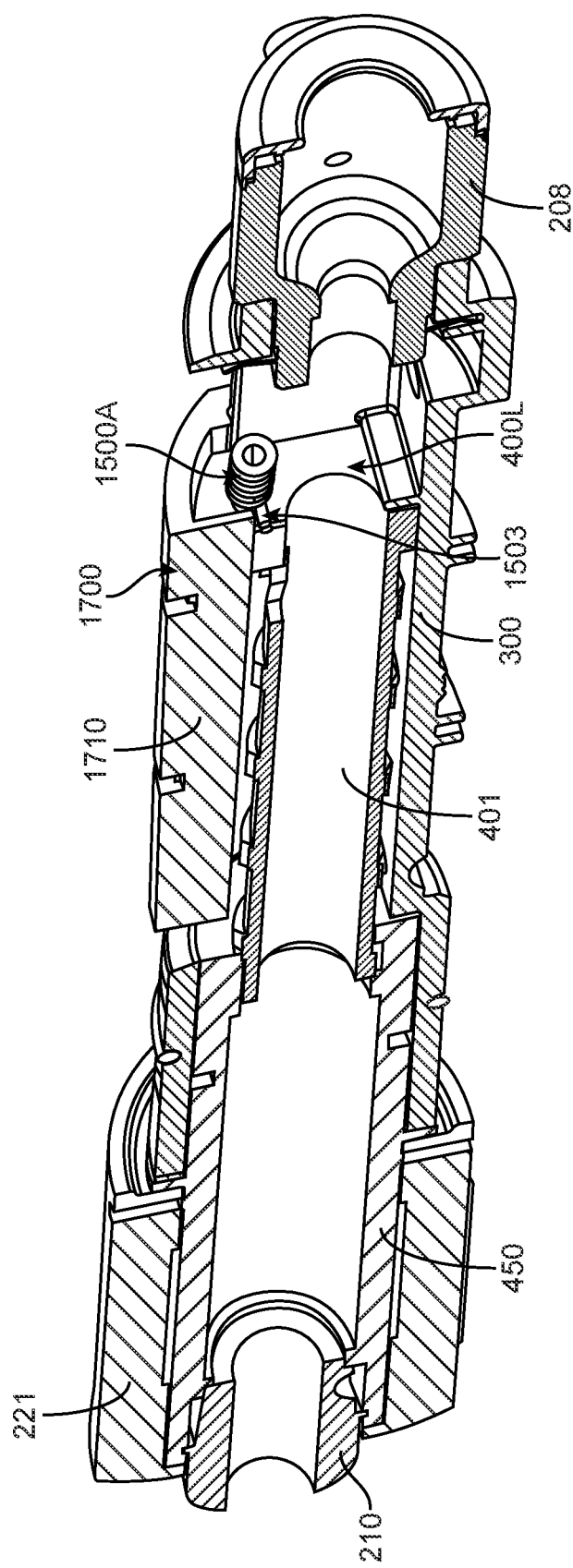
FIG. 20 is a cross-sectional view of the handle assembly of FIG. 1 with the slide block divider of FIG. 17.

FIG. 15 and FIG. 16 illustrate pin assemblies configured to attach deflection wires to slide members in a handle assembly herein. In FIG. 15, pin assemblies are coupled to the slide members 400L and 400R, respectively of the handle assembly 200 of the introducer 100 (e.g., see FIG. 1). In the illustrated embodiment, the handle assembly 200 includes a first pin assembly 1500A and a second pin assembly 1500B to couple the deflection wires (e.g., the deflection wires 141 and 142 in FIG. 5A). Each pin assembly includes a connector shaft having a wire channel, a pin, and a spring.

For example, as shown in FIG. 16, the first pin assembly 1500A includes a first connector shaft 1501, a first pin 1503, and a first spring 1507. The first connector shaft 1501 is cylindrical in shape and the first pin 1503 is transversely disposed through the first connector shaft 1501. The first spring 1507 is disposed over the first connector shaft 1501 and abuts against the first pin 1503 to secure the pin 1503 in place. The first connector shaft 1501 includes a wire channel 1505 extending from a distal end 1511 to a proximal end 1512 of the first connector shaft 1501. The wire channel 1505 is configured to axially receive a deflection wire passed through the slide member 400L. The wire channel 1505 of the first connector shaft 1501 can be aligned with a deflection wire channel (e.g., see the channel 414 in FIG. 7D) of the slide member 400L. The deflection wire (e.g., 141 in FIG. 5A) can be received through the wire channel 1505 and coupled to the first pin 1501.

As shown in FIG. 15, the first pin 1503 of the first pin assembly 1500A is disposed at a proximal end of the first deflection wire channel (e.g., 414) of the first slide member 400L. The first connector shaft 1501 extends axially from the slide member 400L while the first pin 1502 extends transversely. Similar to the first pin assembly 1500A, the second pin assembly 1500B has a second pin 1523 disposed at a proximal end of a second deflection wire channel of the second slide member 400R. The second deflection wire (e.g., 142) is coupled to the second pin 1523. The first pin 1503 and the second pin 1523 extend toward each other and may limit a vertical height available for a fin of the slide block divider used to prevent the deflection wires from crossing each other when the slide members 400L and 400R move relative to each other. Hence, for the handle 200 employing the pin assemblies 1500A and 1500B, a modified slide block divider can be provided. An example slide block divider 1700 is illustrated and discussed in detail with respect to FIG. 17 through FIG. 20.

Referring to FIG. 17 through FIG. 20 construction and assembly of the slide block divider 1700 in the handle 200 is discussed. The slide block divider 1700 has similar construction as the slide block divider 500 with a modified fin. For example, the slide block divider 1700 includes a pair of rails 1721, 1722 (similar to the rails 521, 522 in FIG. 6A). Each of the pair of rails 1721, 1722 extends along a length of the slide block divider 1700 and is configured to rest on the slide chassis 300 (e.g., on the edge 305e, see FIG. 19). The slide block divider 1700 includes side walls 1731, 1733 (similar to the walls 531, 533) that extend along a length of the slide block divider 1700.

The slide block divider 1700 includes a fin 1710 extending radially toward the slide members 400L and 400R. The fin 1710 has a height L56 extending radially down to and above the first pin 1503 and the second pin 1523 (best seen in FIG. 19 and FIG. 20). Thus, the fin 1710 does not interfere with the pins 1503, 1523 during sliding of the slide members 400L, 400R. The height of the fin is approximately constant along a longitudinal axis of the slide block divider 1700 (see FIG. 17 and FIG. 20). The height L56 of the fin 1710 of the slide block divider 1700 can be less than the height L55 of the extended portion 511 of the fin 510 of the slide block divider 500 (see FIGS. 18 and 6F).

It can be understood that the present disclosure is not limited to a constant height fin, as modification of fin shape along the length of the fin as possible. For example, the fin may have a tapered shape to prevent the first pin 1503 and the second pin 1523 from coming in contact with the fin during sliding of the slide members 400L and 400R. For example, at the pins 1503, 1523 the fin has a shorter height, and the height gradually increases along the length without interfering with the slide members.

Figures 21, 22:
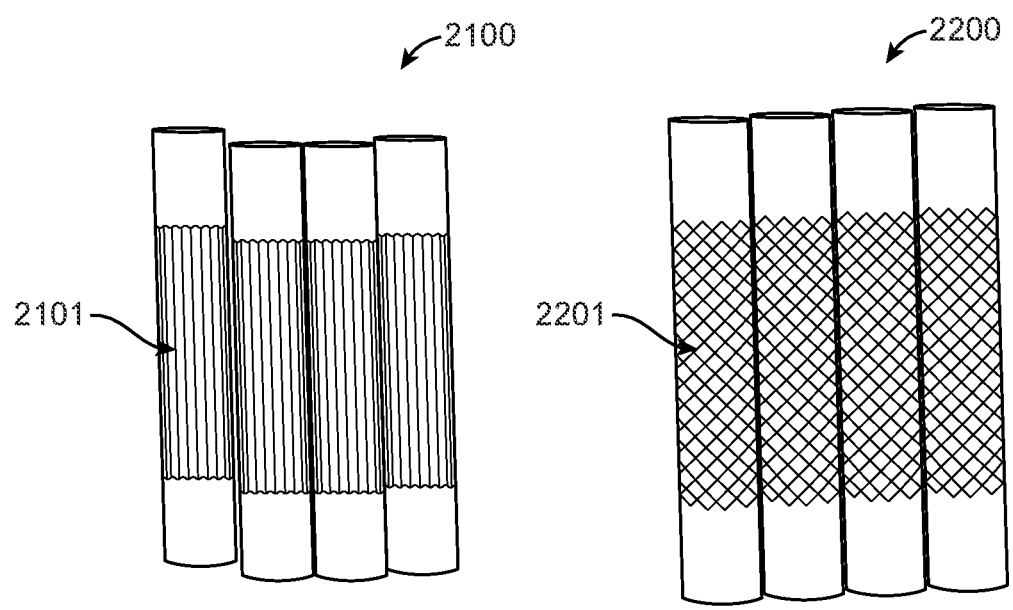
FIG. 21 and FIG. 22 are examples of a pin with textured circumferential surface usable in the pin assembly of FIG. 16.

Furthermore, the pins 1503 and 1523 can be modified to include textured circumferential surface, for example, to provide improved gripping between the deflection wire and the pin. For example, in FIG. 21, the pins 2100 may include a first textured circumferential surface portion 2101. The first textured surface is serrations. As another example, in FIG. 22, pins 2200 may include a second textured circumferential surface portion 2201. The second textured surface are diamond shape texture.

It can be understood that the catheter 1410 and electrode configuration herein are presented by way of example and does not limit the scope of the present disclosure. A person of ordinary skill in the art may employ other types of catheters and/or electrodes.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A steerable introducer comprising:
an elongated body comprising a proximal end, a steerable section, a first deflection lumen extending between the proximal end and the steerable section, and a second deflection lumen extending between the proximal end and the steerable section;
a first deflection wire extending within the first deflection lumen and actuatable to induce deflection of the steerable section of the elongated body in a first direction;
a second deflection wire extending within the second deflection lumen and actuatable to induce deflection of the steerable section of the elongated body in a second direction;
a handle assembly coupled to the proximal end of the elongated body, the handle assembly comprising:
a handle housing;
a slide chassis disposed within the handle housing;
a first slide member drivingly coupled with the first deflection wire;
a second slide member drivingly coupled with the second deflection wire;
a slide block divider disposed within the handle housing, wherein the slide block divider and the slide chassis combine to:
form a slide compartment in which each of the first slide member and the second slide member is slidably disposed,
prevent the first deflection wire and the second deflection wire from crossing each other within the handle housing, and
constrain each of the first slide member and the second slide member during translation within the slide compartment to inhibit motion transverse to a longitudinal direction of the slide compartment; and
an actuation assembly drivingly coupled with each of the first slide member and the second slide member, wherein the actuation assembly is operable to simultaneously drive the first slide member distally and the second slide member proximally within the slide compartment, and wherein the actuation assembly is operable to simultaneously drive the first slide member proximally and the second slide member distally within the slide compartment.

2. The steerable introducer of claim 1, wherein:
the slide chassis includes a slide member opening extending along a length of the slide chassis; and
the slide member opening is configured to accommodate installation of at least one of the first slide member and the second slide member into the slide chassis.

3. The steerable introducer of claim 2, wherein:
the slide chassis comprises support edges configured to support the slide block divider; and
the slide member opening is at least partially defined by the support edges.

4. The steerable introducer of claim 3, wherein the slide chassis includes shoulders for locating the slide block divider, and the shoulders extend in a plane perpendicular to the support edges at an end close to the distal end of the slide chassis.

5. The steerable introducer of claim 1, wherein the slide chassis is substantially cylindrical in shape.

6. The steerable introducer of claim 1, wherein the slide block divider comprises a fin extending toward the slide members to prevent the slide members from rotating and to prevent the first deflection wire from crossing with the second deflection wire within the handle housing.

7. The steerable introducer of claim 6, wherein the fin is a radially projecting portion that extends from a proximal end of the slide block divider to a distal end of the slide block divider and is disposed between the first slide member and the second slide member.

8. The steerable introducer of claim 1, wherein:
the handle housing comprises an inner surface; and
the slide block divider comprises an external surface interfaced with the inner surface of the handle housing.

9. The steerable introducer of claim 8, wherein:
the inner surface of the handle housing has a curved shape with one or more ribs spaced from each other and extending along the curved shape; and
the external surface of the slide block divider has a corresponding curved shape with slots to receive the one or more ribs of the inner surface of the handle housing and to prevent relative motion of the slide block divider with respect to the handle.

10. The steerable introducer of claim 1, wherein:
the slide block divider comprises a pair of rails; and
each of the pair of rails extends along a length of the slide block divider and is configured to rest on the slide chassis.

11. The steerable introducer of claim 10, wherein:
the slide block divider comprises side walls extending along a length of the slide block divider; and
each of the pair of rails is formed on a respective one of the side walls.

12. The steerable introducer of claim 11, wherein the side walls of the slide block divider comprise a tail portion configured to butt against a shoulder of the slide chassis to facilitate assembly and to prevent relative motion between the slide block divider and the slide chassis.

13. The steerable introducer of claim 11, wherein:
the slide chassis comprises flat side portions extending at least partially along a length of the slide chassis; and
inner surfaces of the side walls of the slide block divider contact the flat side portions.

14. The steerable introducer of claim 1, wherein:
the first slide member comprises first slide member distal end side surfaces configured to slide along first slide member side surfaces of the slide block divider to inhibit rotation of the first slide member within the slide compartment; and
the second slide member comprises second slide member distal end side surfaces configured to slide along second slide member side surfaces of the slide block divider to inhibit rotation of the second slide member within the slide compartment.

15. The steerable introducer of claim 1, wherein:
the first slide member comprises a first deflection wire channel through which the first deflection wire extends; and
the second slide member comprises a second deflection wire channel through which the second deflection wire extends.

16. The steerable introducer of claim 15, further comprises:
a first pin assembly having a first pin disposed at a proximal end of the first deflection wire channel, wherein the first deflection wire is coupled to the first pin; and
a second pin assembly having a second pin disposed at a proximal end of the second deflection wire channel, wherein the second deflection wire is coupled to the second pin.

17. The steerable introducer of claim 16, wherein the slide block divider comprises a fin extending radially toward the slide members, wherein the fin has a height extending radially down to and above the first pin and the second pin.

18. The steerable introducer of claim 17, wherein the height of the fin is constant along a longitudinal axis of the slide block divider.

19. The steerable introducer of claim 15, wherein the first slide member and the second slide member are separated by a gap in which a portion of the slide block divider extends.

20. A steerable introducer comprising:
an elongated body comprising a proximal end, a steerable section, a first deflection lumen extending between the proximal end and the steerable section, and a second deflection lumen extending between the proximal end and the steerable section;
a first deflection wire extending within the first deflection lumen and actuatable to induce deflection of the steerable section of the elongated body in a first direction;
a second deflection wire extending within the second deflection lumen and actuatable to induce deflection of the steerable section of the elongated body in a second direction;
a handle assembly coupled to the proximal end of the elongated body, the handle assembly comprising:
a handle housing;
a slide chassis disposed within the handle housing;
a first slide member drivingly coupled with the first deflection wire, the first slide member comprising a first deflection wire channel through which the first deflection wire extends;
a second slide member drivingly coupled with the second deflection wire, the second slide member comprising a second deflection wire channel through which the second deflection wire extends;
a first pin assembly having a first pin disposed at a proximal end of the first deflection wire channel, wherein the first deflection wire is coupled to the first pin; and a second pin assembly having a second pin disposed at a proximal end of the second deflection wire channel, wherein the second deflection wire is coupled to the second pin; and a slide block divider disposed within the handle housing, the slide block divider comprises a fin extending radially toward the first slide member and the second slide members, wherein the fin has a height extending radially down to and above the first pin and the second pin; and an actuation assembly drivingly coupled with each of the first slide member and the second slide member, wherein the actuation assembly is operable to simultaneously drive the first slide member distally and the second slide member proximally, and wherein the actuation assembly is operable to simultaneously drive the first slide member proximally and the second slide member distally.

\* \* \* \* \*